US010350697B2

(12) United States Patent
Marakkala Manage

(10) Patent No.: US 10,350,697 B2
(45) Date of Patent: Jul. 16, 2019

(54) ROTARY CHANGER FOR WELDING TORCHES

(71) Applicant: TIPMAN CO., LTD., Aichi (JP)

(72) Inventor: Anura Silva Marakkala Manage, Aichi (JP)

(73) Assignee: TIPMAN CO., LTD., Aichi (JP)

( * ) Notice: Subject to any disclaimer, the term of this patent is extended or adjusted under 35 U.S.C. 154(b) by 353 days.

(21) Appl. No.: 15/358,193

(22) Filed: Nov. 22, 2016

(65) Prior Publication Data

US 2017/0072500 A1  Mar. 16, 2017

Related U.S. Application Data

(63) Continuation of application No. PCT/JP2016/002614, filed on May 30, 2016.

(30) Foreign Application Priority Data

Jun. 9, 2015 (JP) .................................. 2015-116485
Sep. 15, 2015 (JP) .................................. 2015-182053

(51) Int. Cl.
*B23K 9/32* (2006.01)
*B23K 9/26* (2006.01)
(Continued)

(52) U.S. Cl.
CPC ................ *B23K 9/32* (2013.01); *B23K 9/123* (2013.01); *B23K 9/173* (2013.01); *B23K 9/26* (2013.01)

(58) Field of Classification Search
CPC ...... B23K 11/3063–3072; B23K 11/31; B23K 11/318; B23Q 3/157; B25J 15/0425
See application file for complete search history.

(56) References Cited

U.S. PATENT DOCUMENTS 4,000,954 A * 1/1977 Patel .................. B23Q 3/15706
279/50
4,645,901 A * 2/1987 Scholz ................... B23K 9/323
219/125.1
(Continued)

FOREIGN PATENT DOCUMENTS

EP       0353385 A2 * 2/1990 ........... B23B 31/113
JP       05-031636 A    2/1993
(Continued)

OTHER PUBLICATIONS

International Search Report for corresponding International Application No. PCT/JP2016/002614 dated Jul. 12, 2016.
(Continued)

*Primary Examiner* — Tyrone V Hall, Jr.
(74) *Attorney, Agent, or Firm* — Renner, Otto, Boisselle & Sklar, LLP

(57) ABSTRACT

Disclosed herein is a rotary changer including a rotator rotatable on a rotational axis extending vertically. An interlocking member is arranged to rotate integrally with the rotator and be movable in a direction intersecting with the rotational axis. The interlocking member has an interlocking groove interlockable with an outer peripheral surface of a nozzle inserted into the hollow of the rotator. Rotating the rotator with the interlocking member interlocked with the nozzle makes the nozzle replaceable.

3 Claims, 17 Drawing Sheets

(51) Int. Cl.
   *B23K 9/12*     (2006.01)
   *B23K 9/173*    (2006.01)

(56) References Cited

U.S. PATENT DOCUMENTS

| | | | | |
|---|---|---|---|---|
| 4,676,142 | A | * | 6/1987 | McCormick ....... B23Q 3/15553 |
| | | | | 279/4.06 |
| 4,815,780 | A | * | 3/1989 | Obrist ................. B23Q 1/0009 |
| | | | | 294/86.4 |
| 6,049,053 | A | * | 4/2000 | Shimada ............ B23K 11/3072 |
| | | | | 219/86.1 |
| 6,716,146 | B2 | * | 4/2004 | Kato .................... B23Q 1/5468 |
| | | | | 483/58 |

FOREIGN PATENT DOCUMENTS

| | | | | |
|---|---|---|---|---|
| JP | 05031636 | A | * | 2/1993 |
| JP | 05-039766 | U | | 5/1993 |
| JP | 2000-107832 | A | | 4/2000 |
| JP | 2001-105134 | A | | 4/2001 |
| JP | 2001105134 | A | * | 4/2001 |
| JP | 2002-192345 | A | | 7/2002 |

OTHER PUBLICATIONS

Form PCT/ISA/237 for corresponding International Application No. PCT/JP2016/002614 dated Jul. 12, 2016.
Extended European Search Report dated Apr. 10, 2017 for corresponding European Application No. 16 79 4915.

\* cited by examiner

ROTARY CHANGER FOR WELDING TORCHES

CROSS-REFERENCE TO RELATED APPLICATION

This is a continuation of International Application No. PCT/JP2016/002614 filed on May 30, 2016, which claims priority to Japanese Patent Application No. 2015-116485 filed on Jun. 9, 2015. The entire disclosures of these applications are hereby incorporated by reference.

BACKGROUND

The present disclosure relates to a rotary changer for welding torches configured to automatically replace a torch component such as a cylindrical nozzle or a contact tip bar to be screwed on, and coupled to, a tip portion of the body of a welding torch for use in arc welding.

Changer assemblies for replacing torch components automatically and efficiently have been known in the art. Examples of such torch components include cylindrical nozzles and contact tip bars to be screwed on, and coupled to, a tip portion of the body of a welding torch for use in arc welding. A changer assembly of this type is disclosed, for example, in Japanese Unexamined Patent Publication No. 2002-192345.

The assembly includes a plurality of changers, each having a recess that opens at the top. Each of those changers is designed to rotate on a rotational axis to be displaced vertically by a drive motor and a gear meshing mechanism. To remove the torch component from the torch body, the welding torch is inserted into the recess with the changer kept rotating, thereby getting the recess interlocked with the torch component and rotating the torch component along with the changer to allow the torch component to get removed from the torch body. Meanwhile, to attach the torch component to the torch body, the torch component is placed in the changer such that its tip end faces downward and the torch body is gradually lowered with the changer kept rotating. In this manner, the torch component is attached onto the torch body so as to be screwed onto the tip portion of the torch body.

The changer assembly of Japanese Unexamined Patent Publication No. 2002-192345 fails to specify exactly how the recess of the changer needs to be interlocked with the torch component in order to attach and remove the component onto/from the torch body. For example, misalignment of the center axis of the torch component to be inserted into the recess with the rotational axis of the changer would allow the torch component to unintentionally contact with a portion of the changer's recess to get interlocked with the torch component, which would possibly cause deformation or damage to the recess of the changer.

In view of the foregoing background, it is therefore an object of the present disclosure to provide a rotary changer for welding torches configured to prevent a portion of the changer interlockable with the torch component from being significantly deformed or damaged while the torch component is repeatedly attached to, or removed from, the torch body.

SUMMARY

To achieve this object, the changer according to the present disclosure may be configured such that while the torch component is being inserted into a rotator configured to attach or remove the torch component to/from the torch body by rotating, that portion of the rotator interlockable with the torch component is arranged to avoid contact with the torch component. Alternatively, the changer may also be configured such that on contacting with the torch component, the interlockable portion of the rotator immediately starts going away from the torch component.

Specifically, the present disclosure is directed to a rotary changer for welding torches configured to replace a cylindrical or bar-shaped torch component screwed on, and coupled to, a tip portion of the body of a welding torch. This changer may be implemented in at least one of the following embodiments.

Specifically, a first aspect of the present disclosure is a rotary changer comprising: a rotator arranged rotatably on a rotational axis and having an opening located at one end of the rotator, and a hollow into which the torch component is insertable through the opening such that a center axis of the torch component is aligned with the rotational axis of the rotator; and an interlocking member configured to rotate integrally with the rotator and to be movable in a direction intersecting with the rotational axis. The interlocking member includes an interlocking portion provided on one side of the interlocking member facing the rotational axis. The interlocking portion is interlockable with the torch component. The rotator rotates with the interlocking portion interlocked with the torch component, thereby turning the torch component on its center axis to either remove or attach the torch component from/onto the tip portion of the torch component's body.

A second aspect of the present disclosure is an embodiment of the first aspect. In the second aspect, the rotator comprises a cam means including a sliding portion and a cam portion. The sliding portion is slidable along its rotational axis and configured to slide toward the other end of the rotator when pressed by the torch component being inserted into the hollow. The cam portion is configured to move the interlocking member toward the rotational axis while the sliding portion is sliding toward the other end of the rotator.

A third aspect of the present disclosure is an embodiment of the second aspect. In the third aspect, the rotator includes a rotary case configured to house the sliding portion in a slidable state. The other side of the interlocking member facing away from the rotational axis has a first sloping surface sloping toward the rotational axis as a point of interest moves toward the other end of the rotator. The sliding portion defines a cylinder having the hollow inside, and has a peripheral wall with a guide hole that guides the interlocking member in a direction intersecting with the rotational axis. The cam portion is provided for the rotary case, and has a second sloping surface causing the interlocking member to move toward the rotational axis by allowing the first sloping surface to make sliding contact with the second sloping surface while the sliding portion is sliding toward the other end of the rotator.

A fourth aspect of the present disclosure is an embodiment of the first aspect. In the fourth aspect, a first biasing means for biasing the interlocking member toward the rotational axis is provided between the interlocking member and the rotator. The first biasing means includes a plurality of biasing means arranged at regular intervals around the rotational axis.

A fifth aspect of the present disclosure is an embodiment of the fourth aspect. In the fifth aspect, the torch component is a cylindrical nozzle having, on its outer peripheral surface, a knurled engaging portion extending in a circumferential direction. The interlocking portion has an engageable portion engageable with the engaging portion. As the welding torch is moved along the rotational axis such that the center axis of the welding torch is aligned with the rotational axis, the engaging portion gets engaged with the engageable portion, thus allowing the interlocking member to get interlocked with the outer peripheral surface of the nozzle.

A sixth aspect of the present disclosure is an embodiment of the fifth aspect. In the sixth aspect, the rotator includes: a first cylindrical member, of which the center axis is aligned with the rotational axis; a second cylindrical member, of which the center axis is aligned with the rotational axis and which is provided inside the first cylindrical member so as to be slidable along the rotational axis; and a second biasing means configured to bias the second cylindrical member toward the one end of the rotator. The hollow is provided inside the second cylindrical member.

A seventh aspect of the present disclosure is an embodiment of any one of the fourth to sixth aspects. In the seventh aspect, the first biasing means comprises ball plungers.

An eighth aspect of the present disclosure is an embodiment of the first aspect. In the eighth aspect, the rotary changer includes: a supporting plate configured to support the rotator; a base plate arranged in parallel with the supporting plate so as to face one side of the supporting plate opposite from the rotator; a tilt maintaining means arranged between the supporting plate and the base plate to maintain the tilt of the supporting plate with respect to the base plate; and a plurality of stretchable means configured to be stretchable along the rotational axis and arranged between the supporting plate and the base plate and around the tilt maintaining means. Each of the stretchable means has one end thereof secured to the supporting plate and the other end thereof secured to the base plate.

A ninth aspect of the present disclosure is an embodiment of the eighth aspect. In the ninth aspect, the tilt maintaining means includes: a first supporting member secured to one of the supporting plate or the base plate and having a curved recessed portion with a recess having a diameter gradually decreasing toward the secured portion of the first supporting member; and a second supporting member secured to the other of the supporting plate or the base plate and having a curved raised portion to be slidably fitted into the curved recessed portion.

A tenth aspect of the present disclosure is an embodiment of the eighth or ninth aspect. In the tenth aspect, the stretchable means is comprised of: a stretchable rubber portion; and mounting portions configured to mount the rubber portion to the supporting plate and the base plate.

According to the first aspect, the torch component and the interlocking member may have their relative positions changed in a direction intersecting with the rotational axis. Thus, while the torch component is being inserted into the hollow of the rotator, the interlocking member may be moved in advance away from the rotational axis to avoid accidental contact with the torch component. An outer peripheral portion of the torch component possibly contacts with the interlocking portion of the interlocking member. Even so, bringing the outer peripheral portion of the torch component into sliding contact with the interlocking portion of the interlocking member still allows the interlocking member to move such that the position of the interlocking portion agrees with that of the outer peripheral surface of the torch component. This results in avoidance of deformation or damage around the interlocking member.

According to the second aspect, inserting the torch component into the hollow of the rotator allows the interlocking member to move toward the rotational axis and get interlocked with the outer peripheral surface of the torch component. This eliminates the need to provide any separate drive source to actuate the interlocking member and eventually cuts down the cost of the machine. In addition, pressing the interlocking portion of the interlocking member against the outer peripheral surface of the torch component increases not only the degree of close contact, but also the linkage, between the torch component and the interlocking member as well.

According to the third aspect, the interlocking member moves integrally with the sliding portion and the torch component toward the other end of the rotator while moving toward the rotational axis. Thus, when the interlocking portion contacts with the outer peripheral surface of the torch component, no frictional resistance is produced between them, which significantly reduces the wear of the interlocking portion and the torch component.

While the torch component and the interlocking member are getting interlocked with each other via the interlocking portion, the respective center axes of the tip portion of the torch body and the torch component may be misaligned with the rotational axis of the rotator. In that case, according to the fourth aspect, the misalignment causes the interlocking member to move in the direction of the misalignment and get interlocked with the torch component as each of the first biasing means stretches and shrinks. Then, the respective first biasing means keep the interlocking member misaligned such that the rotation of the rotator causes the interlocking member to turn on the center axis of the torch component. Thus, the torch component turns on the respective center axes of the tip portion of the torch body and the torch component that are still misaligned with respect to the rotational axis of the rotator. This substantially eliminates the imposition of unnecessary load on the tip portion of the torch body while the torch component is being removed, which thus significantly reduces failures of welding torches.

Also, assume that the tip portion of the torch body is brought closer to, and eventually mounted onto, the torch component with the rotator allowed to rotate while the torch component is interlocked with the interlocking member and while the center axis of the tip portion of the torch body is misaligned with the rotational axis of the rotator. In that case, the torch component starts to get screwed on, and coupled to, the tip portion of the torch body such that its center axis is shifted to agree with that of the tip portion of the torch body as each of the first biasing means stretches and shrinks. Thus, the torch component may be mounted onto the tip portion of the torch body while rotating on the center axis of the tip portion of the torch body with their respective center axes aligned with each other. This substantially eliminates the imposition of unnecessary load on the tip portion of the torch body while the torch component is being mounted, which thus significantly reduces failures of welding torches.

According to the fifth aspect, the engaging portion is a knurled one. Thus, rotating the rotator while inserting the welding torch into the hollow makes the engaging portion of the nozzle contact with the engageable portion of the interlocking member first and then allows the respective teeth and spaces of the engaging portion to face, and mesh with, their counterparts of the engageable portion at predetermined timings. This allows the engaging portion to get engaged with the engageable portion while letting the nozzle move toward the other end of the rotator. Consequently, simply inserting the welding torch into the hollow allows the nozzle and interlocking member to get interlocked with each other.

According to the sixth aspect, rotating the rotator while inserting the welding torch into the hollow allows the second cylindrical member to slide toward the other end of the rotator against the biasing force of the second biasing means since the engaging portion has contacted with the engageable portion and until the respective teeth and spaces of the engaging portion face their counterparts of the engageable portion. As a result, the second biasing means absorbs the force applied to the second cylindrical member. Also, when the respective teeth and spaces of the engaging portion face their counterparts of the engageable portion, the nozzle moves toward the other end of the rotator and the second cylindrical member slides toward the one end of the rotator under the biasing force of the second biasing means, thus causing the engaging portion to get engaged with the engageable portion. This sufficiently reduces the load to be imposed on the rotator while the engaging portion is getting engaged with the engageable portion, thus making the machine less fragile and getting the engaging portion engaged more easily with the engageable portion.

According to the seventh aspect, the respective ball portions of the ball plungers reduce the frictional resistance between the ball plungers and the interlocking member moving through the hollow. This thus allows the interlocking member to smoothly move to a position facing the torch component.

According to the eighth aspect, inserting the welding torch in a tilted position into the hollow of the rotator causes the supporting plate to get tilted around the tilt maintaining means to the same degree as the welding torch and also allows each stretchable means to stretch or shrink to a degree corresponding to the tilt of the supporting plate. Thus, even if the welding torch in such a tilted position is inserted into the hollow of the rotator, the torch component may also be replaced with no load imposed on the torch body.

According to the ninth aspect, the sliding contact between the curved raised and recessed portions of the tilt maintaining means allows the supporting plate to smoothly tilt toward any direction. Thus, even if the welding torch tilts to varying degrees every time the torch component is replaced at the tip portion of the torch body, the supporting plate may be tilted flexibly to any desired degree corresponding to the specific degree of tilt each time.

According to the tenth aspect, the stretchable means is allowed to stretch and shrink with a simple structure, which lowers the manufacturing unit price of the stretchable means, and ultimately, cuts down the overall cost of the machine.

DETAILED DESCRIPTION

Embodiments of the present disclosure will now be described in detail with reference to the accompanying drawings. Note that the following description of embodiments is only an example in nature and is not intended to limit the scope, application, or uses of the present disclosure.

First Embodiment of this Disclosure

Figure 1:
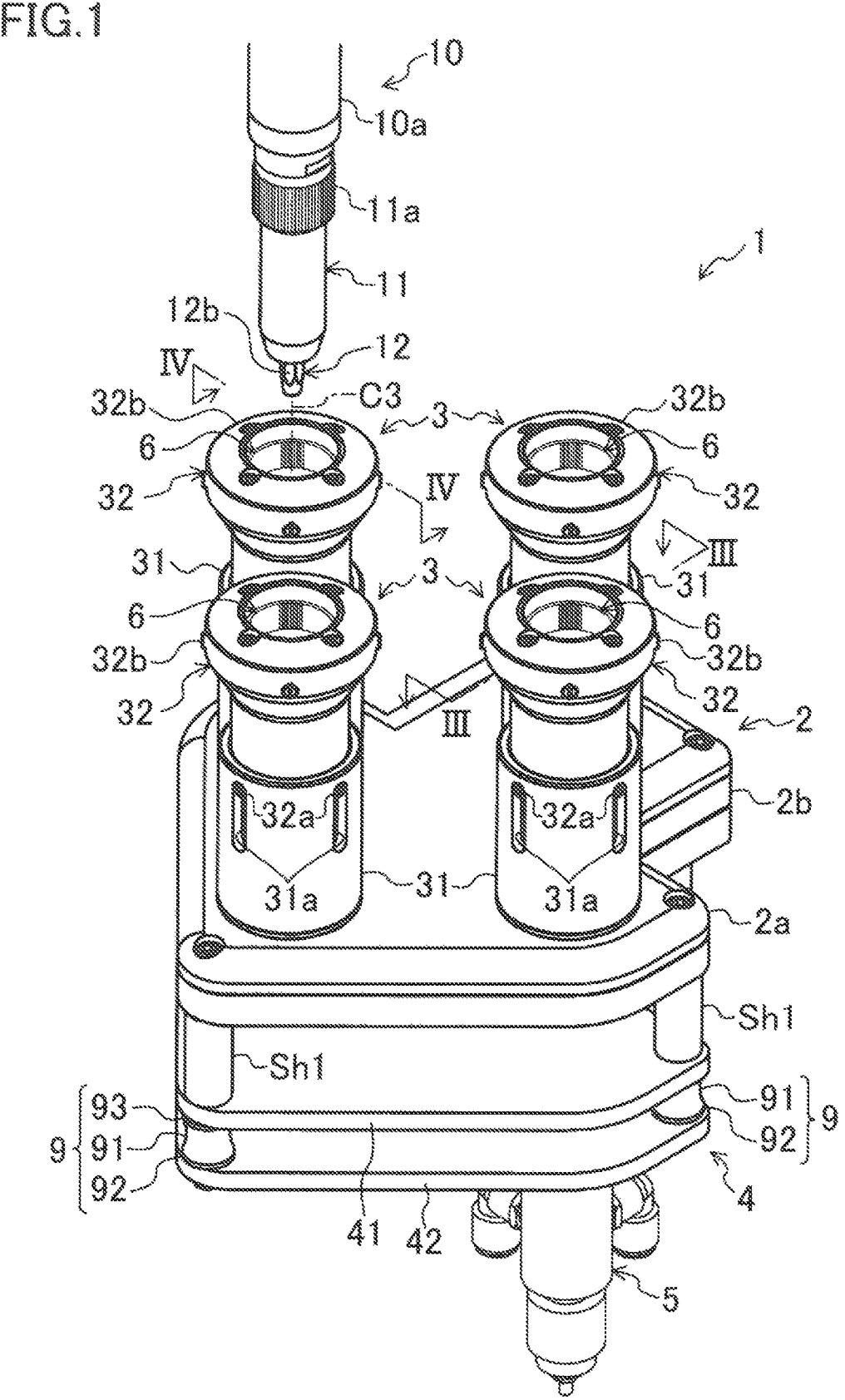
FIG. 1 is a perspective view illustrating a rotary changer for welding torches according to a first exemplary embodiment of the present disclosure.

FIG. 1 illustrates a rotary changer 1 for welding torches according to a first exemplary embodiment of the present disclosure. This rotary changer 1 is designed to automatically replace a metallic nozzle 11, which is an exemplary torch component of a welding torch 10 for use to weld a steel plate, for example, by arc welding.

Figure 9:
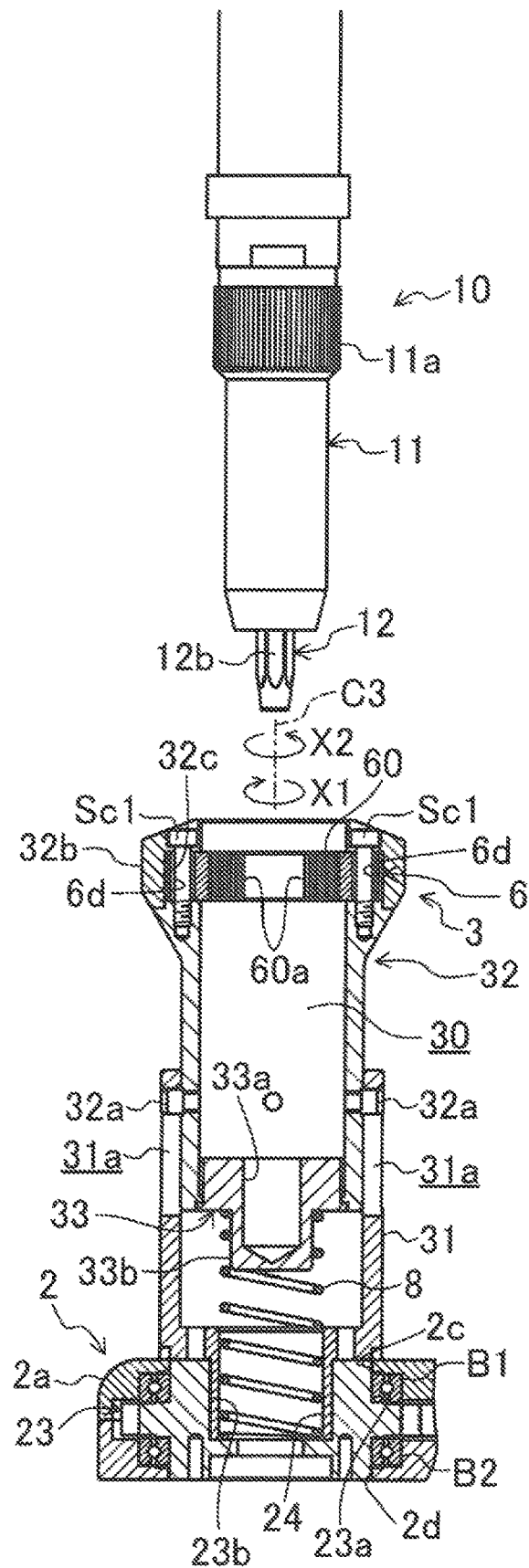
FIG. 9 is a view corresponding to the cross-sectional view shown in FIG. 4 and illustrating either a state where a nozzle is on the verge of being removed from the tip portion of a torch body or a state where the nozzle has just been attached to the tip portion of the torch body.
Figure 10:
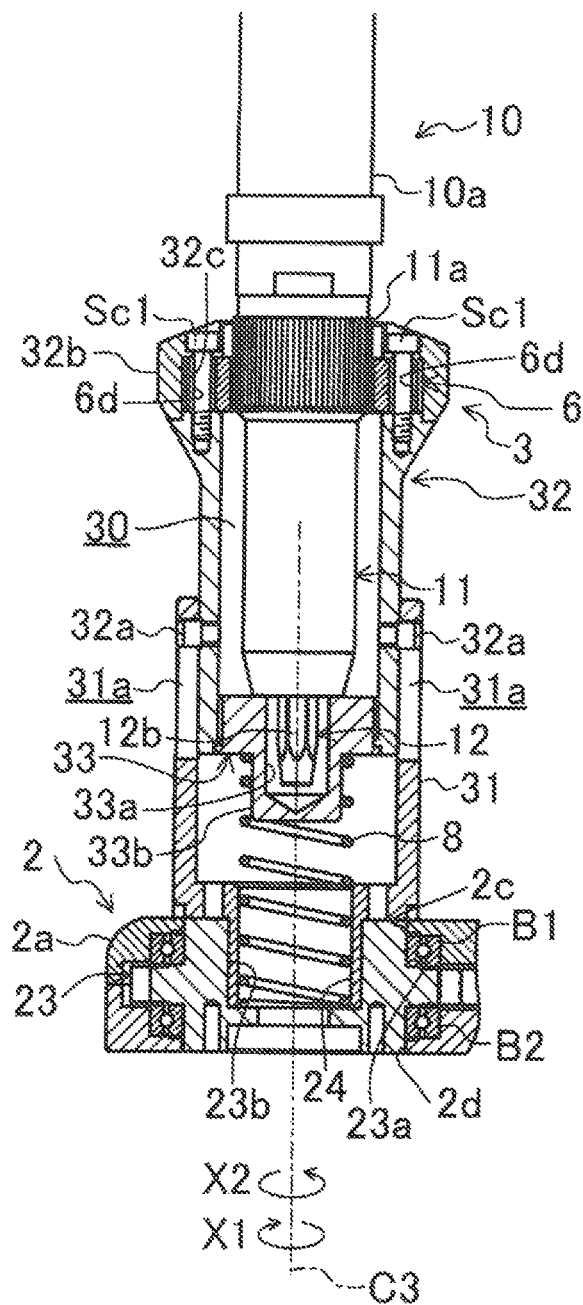
FIG. 10 is a view corresponding to the cross-sectional view shown in FIG. 4 and illustrating either a state where a nozzle is being removed from the tip portion of a torch body or a state where the nozzle is being attached to the tip portion of the torch body.
Figure 11:
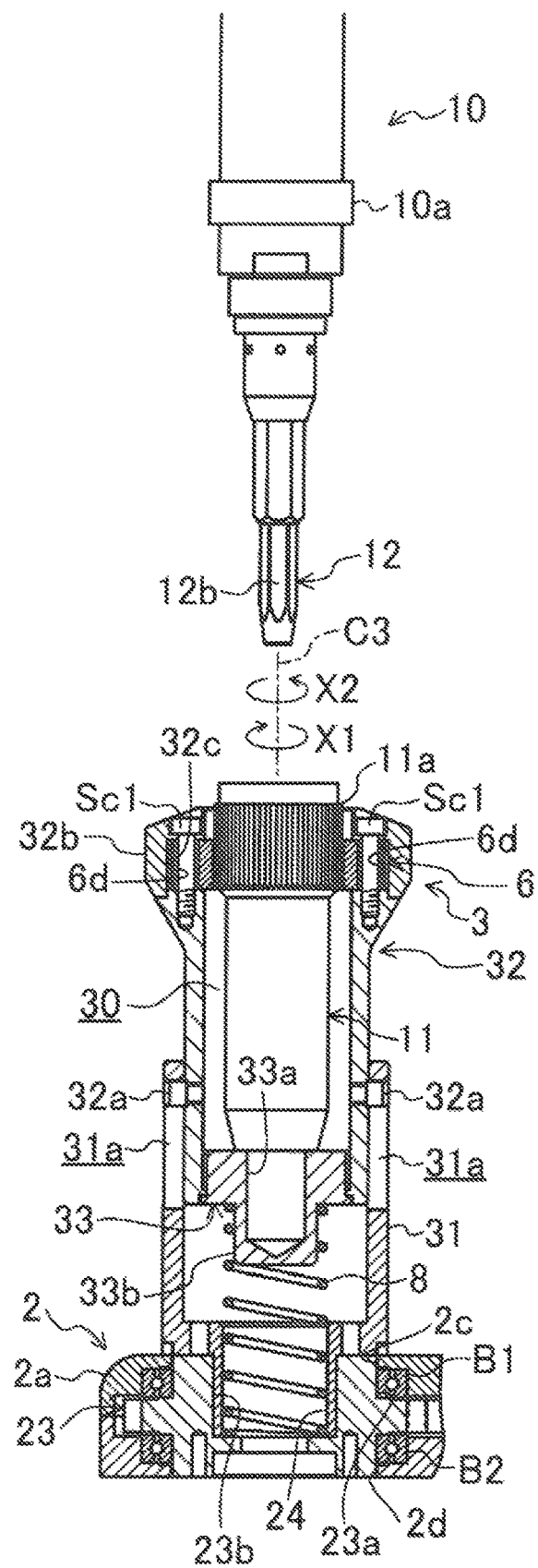
FIG. 11 is a view corresponding to the cross-sectional view shown in FIG. 4 and illustrating either a state where a nozzle has just been removed from the tip portion of a torch body or a state where the nozzle is on the verge of being attached to the tip portion of the torch body.

As shown in FIGS. 9-11, this welding torch 10 includes a circular columnar torch body 10a, and the nozzle 11 having a cylindrical shape is screwed on, and coupled to, a tip portion of the torch body 10a.

The tip portion of the nozzle 11 has a tapered shape, of which the diameter gradually decreases toward an opening at the tip end. Meanwhile, a base-end outer peripheral surface of the nozzle 11 has a knurled engaging portion 11a extending in the circumferential direction.

That is to say, the engaging portion 11a has a large number of teeth and spaces which extend along the center axis of the nozzle 11 and which are arranged alternately around the center axis.

A copper contact tip 12 (which is an exemplary torch component) in a fine bar shape is screwed on, and coupled to, the tip of the torch body 10a. The tip portion of the contact tip 12 sticks out of the opening at the tip end of the nozzle 11.

As shown in FIG. 11, a portion of the contact tip 12 covering a middle through the tip of its outer peripheral surface has a tapered shape, of which the diameter gradually decreases toward the tip of the contact tip 12. The outer peripheral surface of the contact tip 12 also has two flat portions 12*b* which are parallel to each other with the center axis interposed between them and which are located closer to the base end.

As shown in FIG. 1, this rotary changer 1 includes a gearbox 2 having an arrow shape in a plan view, four cylindrical rotators 3 provided on the upper surface of the gearbox 2, and a tilt unit 4 having a substantially triangular shape in a plan view. The gearbox 2 is comprised of a thick triangular plate portion 2*a* and a thick rectangular plate portion 2*b* continuous with the triangular plate portion 2*a*. The tilt unit 4 is arranged under the triangular plate portion 2*a* of the gearbox 2 in parallel with the gearbox 2. The three corners of the triangular plate portion 2*a* of the gearbox 2 and the three corners of the tilt unit 4 are respectively coupled together with vertically extending coupling shafts Sh1.

Figure 5:
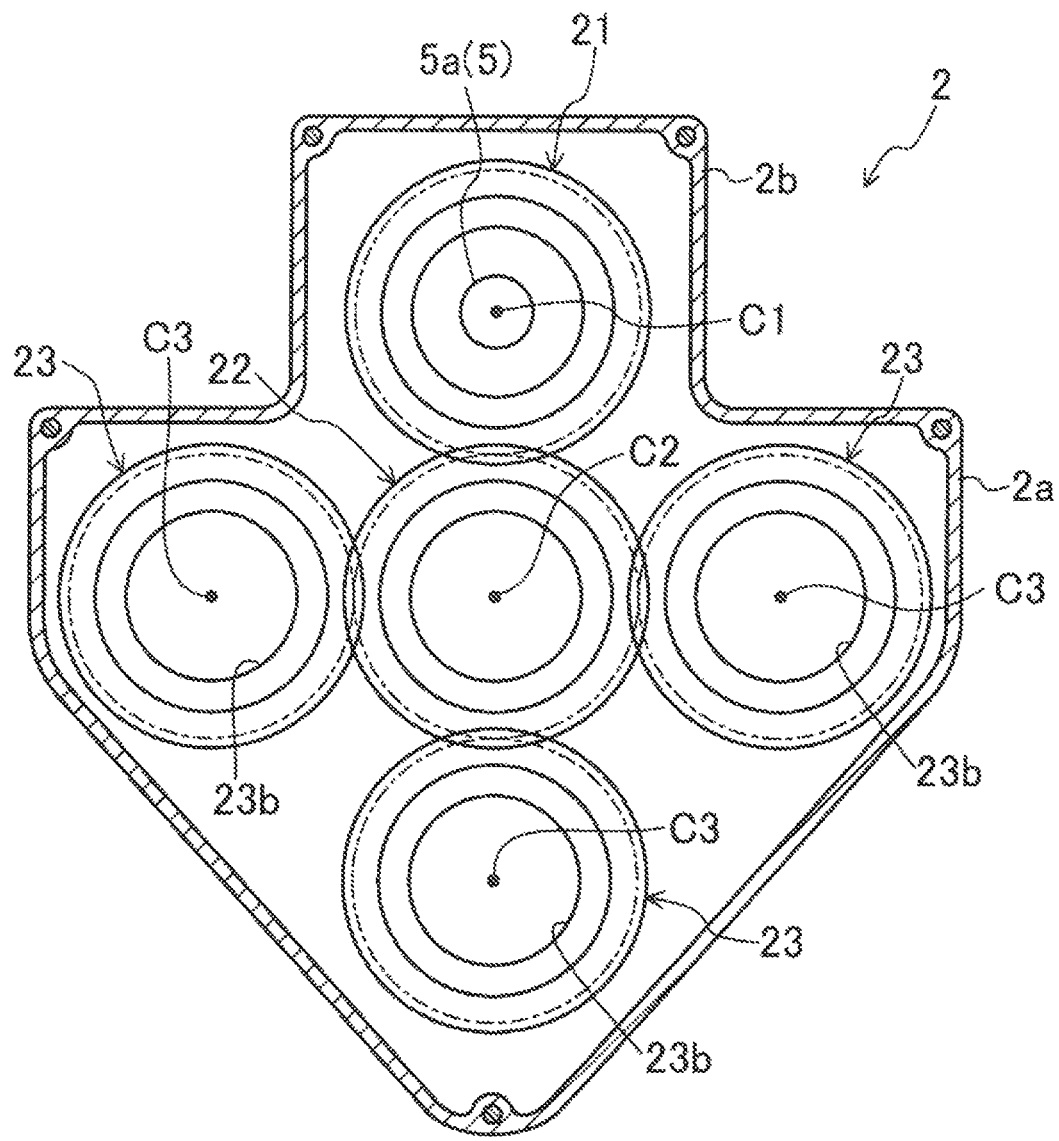
FIG. 5 is a plan view illustrating how respective gears mesh with each other inside a gearbox.

A motor 5 to be activated when supplied with compressed air is mounted to the lower surface of the rectangular plate portion 2*b* of the gearbox 2. The output shaft 5*a* of the motor 5 extends vertically and faces the inside of the rectangular plate portion 2*b* of the gearbox 2 as shown in FIG. 5. In the first exemplary embodiment of the present disclosure, the motor 5 is supposed to operate under air control. However, a servo control motor may be used instead.

Inside the rectangular plate portion 2*b* of the gearbox 2, provided is a substantially disklike input gear 21 rotatable on a rotational axis C1 that extends vertically. The output shaft 5*a* is connected to the center of the input gear 21.

An idler gear 22 meshing with the input gear 21 is provided to be rotatable on a rotational axis C2 extending vertically and is arranged inside the triangular plate portion 2*a* of the gearbox 2 and adjacent to the rectangular plate portion 2*b*.

Figure 4:
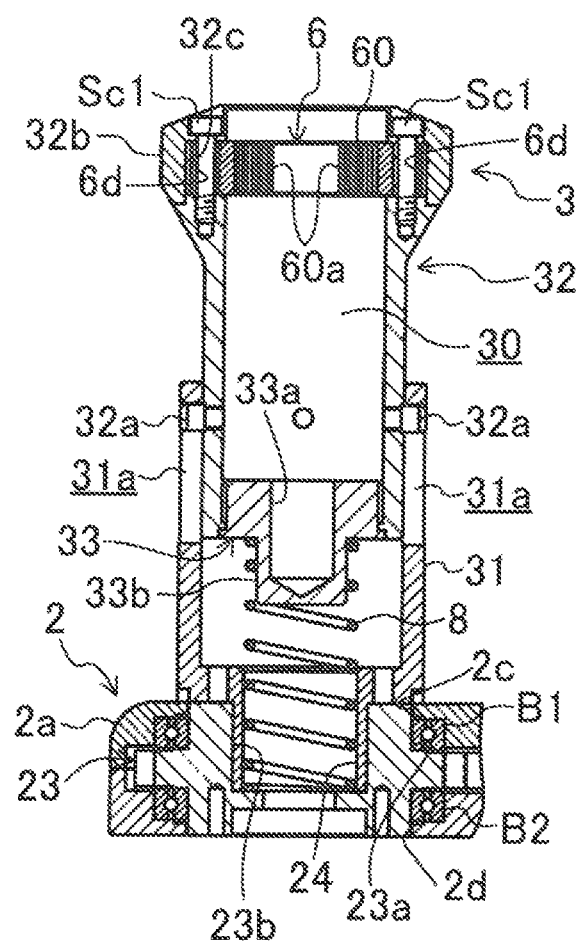
FIG. 4 is a cross-sectional view taken along the plane IV-IV shown in FIG. 1.

Around the three corners of the triangular plate portion 2*a* of the gearbox 2, the upper surface of the triangular plate portion 2*a* has three upper through holes 2*c* with a circular cross section as shown in FIG. 4. Meanwhile, the lower surface of the triangular plate portion 2*a* has three lower through holes 2*d*, each squarely facing an associated one of the upper through holes 2*c*.

A substantially disklike output gear 23 is arranged between each associated pair of the upper and lower through holes 2*c* and 2*d*.

The output gear 23 has a horizontally broad and vertically projecting pivot 23*a* at its center. The pivot 23*a* has a gear recess 23*b* that forms an upward opening.

A cylindrical guide member 24 is fitted into the gear recess 23*b* so as to protrude out of the opening of the gear recess 23*b*.

An upper end portion of the pivot 23*a* is fitted into the upper through hole 2*c*, while a lower end portion of the pivot 23*a* is fitted into the lower through hole 2*d*.

The output gear 23 meshes with the idler gear 22, and is rotatable on a vertically extending rotational axis C3 by having upper and lower end portions of the pivot 23*a* supported rotatably by the triangular plate portion 2*a* via bearings B1 and B2, respectively.

Figure 2:
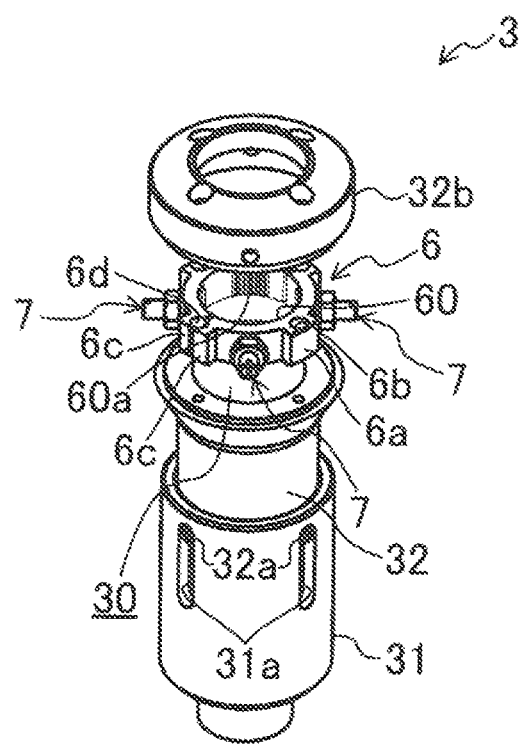
FIG. 2 is an exploded perspective view illustrating a rotator and its associated parts of the rotary changer.

The rotator 3 includes a first cylindrical member 31 secured to the output gear 23 such that its center axis extends vertically so as to be aligned with the rotational axis C3. As shown in FIGS. 1 and 2, an upper half portion of the first cylindrical member 31 has four vertically elongated slits 31*a* which are arranged at regular intervals around the center axis of the cylinder.

A second cylindrical member 32 with a vertically extending center axis is inserted from above into the first cylindrical member 31. The respective center axes of the first and second cylindrical members 31 and 32 agree with each other.

To a vertically lower portion of the outer peripheral surface of the second cylindrical member 32, four pins 32*a* fitted into the respective slits 31*a* are attached as shown in FIG. 4. Guiding these four pins 32*a* inside the respective slits 31*a* allows the second cylindrical member 32 to slide vertically (i.e., along the rotational axis) inside the first cylindrical member 31.

A cap member 33 is fitted into the lower portion of the second cylindrical member 32 to close the bottom opening of the second cylindrical member 32. The cap member 33 and the second cylindrical member 32 together form a hollow 30 opening at the upper end (i.e., at one end of the rotator).

The upper surface of the cap member 33 has a housing recess 33*a* at its center. Meanwhile, the lower surface of the cap member 33 has a protrusion 33*b*, corresponding to the housing recess 33*a* and protruding downward, at its center.

An upper end portion of the second cylindrical member 32 has an annular projection 32*b* projecting outward and sideward and extending around the center axis. Inside the annular projection 32*b*, a recessed groove 32*c* has been formed to extend along the annular projection 32*b*.

Figure 3:
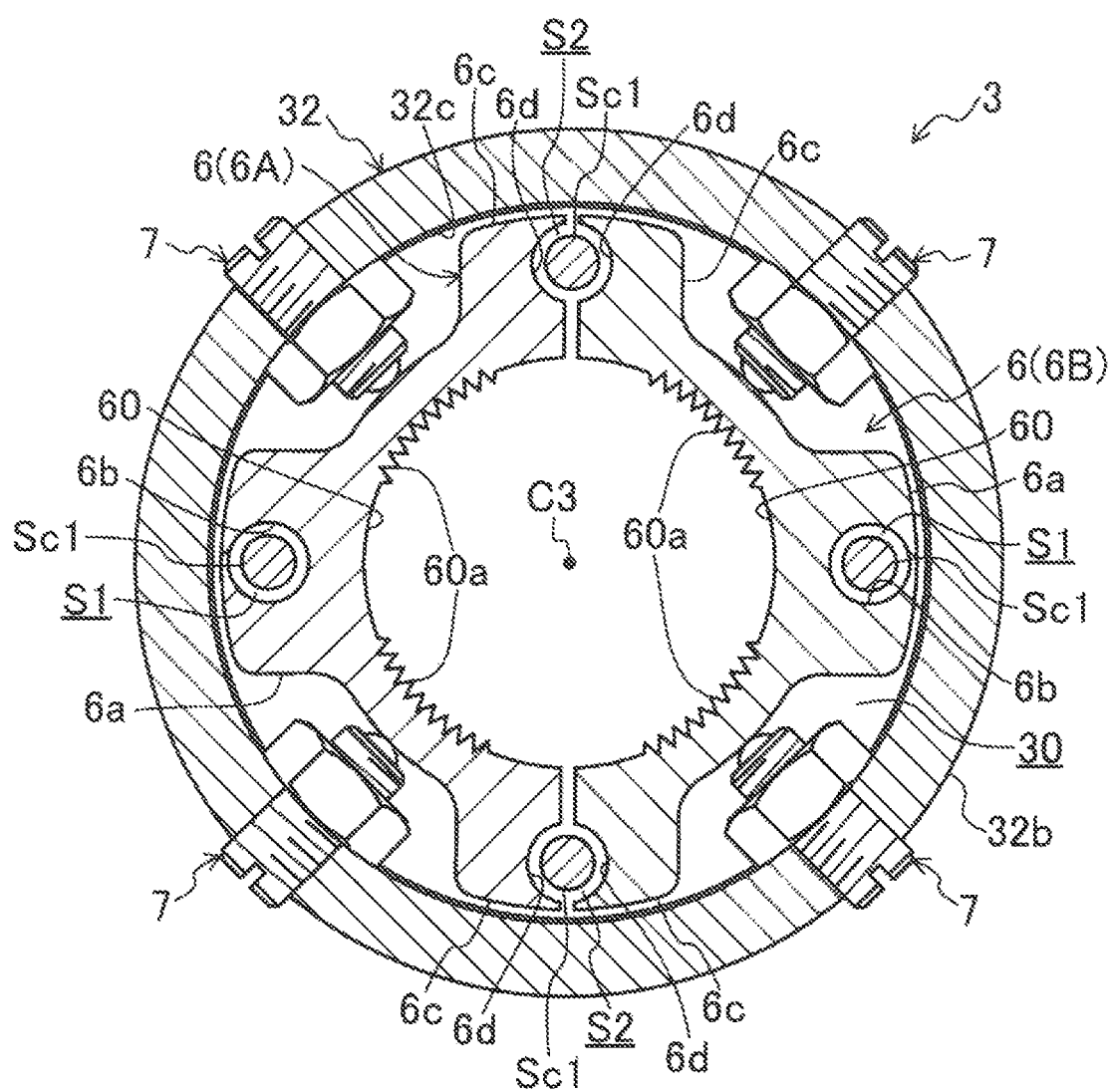
FIG. 3 is a cross-sectional view taken along the plane shown in FIG. 1.

Inside an upper end portion of the second cylindrical member 32, provided is an interlocking member 6 having a generally annular shape in a plan view as shown in FIG. 3. The outer peripheral portion of the interlocking member 6 is freely fitted into the recessed groove 32*c*.

This interlocking member 6 is divided, virtually along a horizontal centerline, into a generally C-shaped first member 6A located on one side of the line and a generally C-shaped second member 6B located on the other side of the line.

The first member 6A has, at its middle portion facing away from the second member 6B, a first expanding portion 6*a* expanding outward and sideward and having a generally rectangular shape in a plan view. An insertion hole 6*b* runs vertically through a middle of the first expanding portion 6*a*.

The first member 6A also has, at both ends thereof, a pair of second expanding portions 6*c* also expanding outward and sideward. A portion of each of these second expanding portions 6*c* facing the second member 6B has a guide groove 6*d* extending vertically and opening at the top and bottom.

A portion of the first member 6A facing the second member 6B and located between the two guide grooves 6*d* is an interlocking groove 60 opening not only toward the second member 6B but also at top and bottom ends as well. The interlocking groove 60 has a recessed shape to mesh with a half of the outer peripheral surface of the nozzle 11.

Portions of the inner peripheral surface of the interlocking groove 60 that are located between the first expanding portion 6*a* and the respective second expanding portions 6*c* function as engageable portions 60*a* engageable with the engaging portion 11*a* of the nozzle 11.

That is to say, the engageable portions 60*a* have respective teeth and spaces that are engageable with their corresponding spaces and teeth of the engaging portion 11*a* and arranged alternately along an arc inner peripheral surface of the interlocking groove 60.

Note that the second member 6B has the same structure as the first member 6A and is only arranged horizontally symmetrically to the first member 6A in a plan view. Thus, the respective portions of the second member 6B will be identified by the same reference numerals as those of their counterparts of the first member 6A and detailed description thereof will be omitted herein.

This interlocking member 6 is mounted to the second cylindrical member 32 with screws Sc1 screwed into the respective insertion holes 6b and the mutually facing guide grooves 6d. Before being screwed up, the interlocking member 6 is arranged such that the respective interlocking grooves 60 of the first and second members 6A and 6B face each other and that each of the two guide grooves 6d of the first member 6A faces a corresponding one of the two guide grooves 6d of the second member 6B.

The interlocking member 6 is configured such that when the interlocking member 6 is mounted to the second cylindrical member 32, gaps S1 and S2 respectively are left between the inner peripheral surface of each insertion hole 6b and the outer peripheral surface of a screw Sc1 screwed therein and between the inner peripheral surface of each pair of guide grooves 6d and the outer peripheral surface of a screw Sc1 screwed therein. That is to say, the interlocking member 6 is allowed to turn on the rotational axis C3 or move horizontally with respect to the second cylindrical member 32 to the degrees allowed by those gaps S1 and S2.

Note that the interlocking member 6 is designed to be rotatable about 0-5 degrees on the rotational axis C3.

Four ball plungers 7 (first biasing means) are arranged at regular intervals between the interlocking member 6 and the recessed groove 32c and around the rotational axis C3. Each of these ball plungers 7 is configured such that its ball contacts with the surface of the interlocking member 6 between the first and second expanding portions 6a and 6b thereof to bias the interlocking member 6 toward the rotational axis C3.

A coil spring 8 (second biasing means) is arranged inside the first cylindrical member 31. An upper portion of the coil spring 8 is externally engaged with the protrusion 33b of the cap member 33, while a lower portion of the coil spring 8 is housed inside the guide member 24 so as to bias the second cylindrical member 32 upward (i.e., toward one end of the rotator).

Then, as shown in FIG. 10, the welding torch 10 is inserted into the hollow 30 of each rotator 3 from over the rotator 3 such that the center axis of the welding torch 10 is aligned with the rotational axis C3, and moved along the rotational axis C3. In the meantime, driving the output shaft 5a of the motor 5 in one direction allows each rotator 3 to rotate clockwise (i.e., in the direction X1) on the rotational axis C3 via the input gear 21, idler gear 22 and three output gears 23. As a result, the engaging portion 11a gets engaged with the engageable portion 60a, thereby getting the interlocking member 6 interlocked with the outer peripheral surface of the nozzle 11.

Specifically, rotating the rotator 3 clockwise while inserting the welding torch 10 into the hollow 30 allows the second cylindrical member 32 to slide toward the first cylindrical member 31 against the biasing force of the coil spring 8 since the engaging portion 11a has contacted with the engageable portion 60a and until the respective teeth and spaces of the engaging portion 11a face their counterparts of the engageable portion 60a. Thereafter, when the respective teeth and spaces of the engaging portion 11a face their counterparts of the engageable portion 60a, the nozzle 11 starts to move downward and the second cylindrical member 32 starts to slide upward under the biasing force of the coil spring 8, thus causing the engaging portion 11a to get engaged with the engageable portion 60a and also causing the interlocking member 6 to get interlocked with the outer peripheral surface of the nozzle 11. In addition, the tip of the contact tip 12 is housed in the housing recess 33a and the opening peripheral edge of the nozzle 11 contacts with that of the housing recess 33a.

Furthermore, as shown in FIG. 11, the rotator 3 is configured to remove the nozzle 11 from the tip portion of the torch body 10a by rotating clockwise with the interlocking member 6 interlocked with the nozzle 11.

On the other hand, this rotary changer 1 is also configured to allow the nozzle 11 to be screwed on, and coupled to, the tip portion of the torch body 10a by setting the nozzle 11 in place into the hollow 30 such that the interlocking member 6 gets interlocked with the nozzle 11 and by rotating the rotator 3 counterclockwise (i.e., in the direction X2) while bringing the torch body 10a closer to the rotator 3 from over the rotator 3.

As can be seen, this rotary changer 1 is designed to replace the nozzle 11 to be screwed on, and coupled to, the tip portion of the torch body 10a by rotating the rotator 3 either clockwise or counterclockwise.

Figure 6:
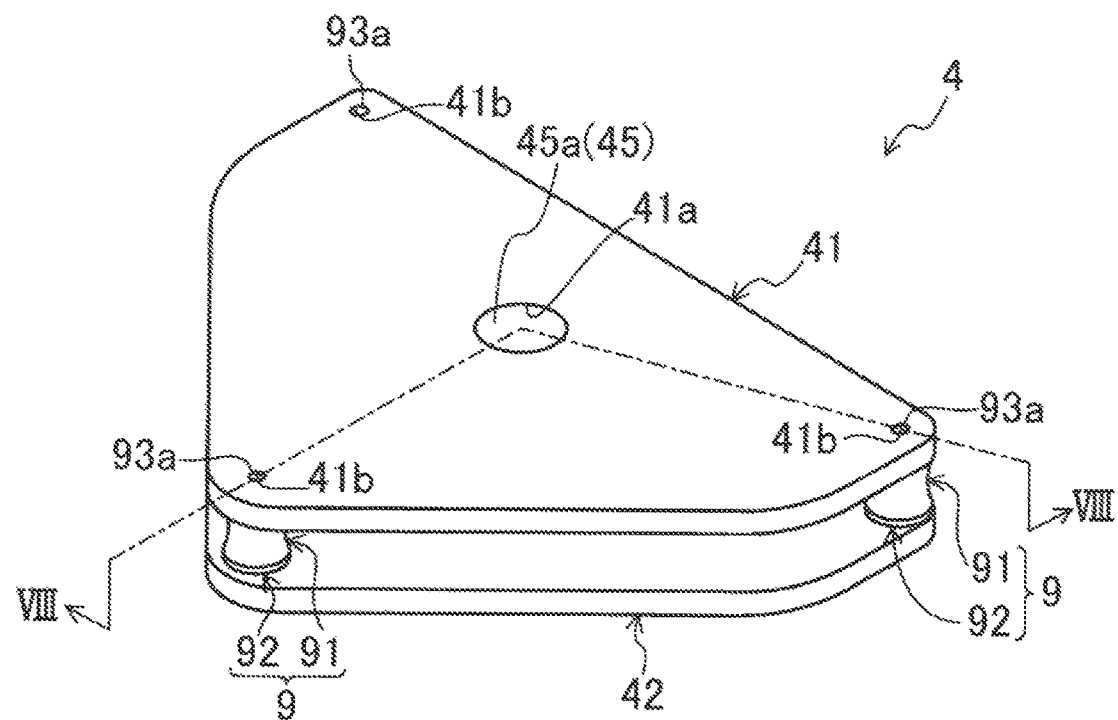
FIG. 6 is a perspective view illustrating a tilt unit.
Figure 7:
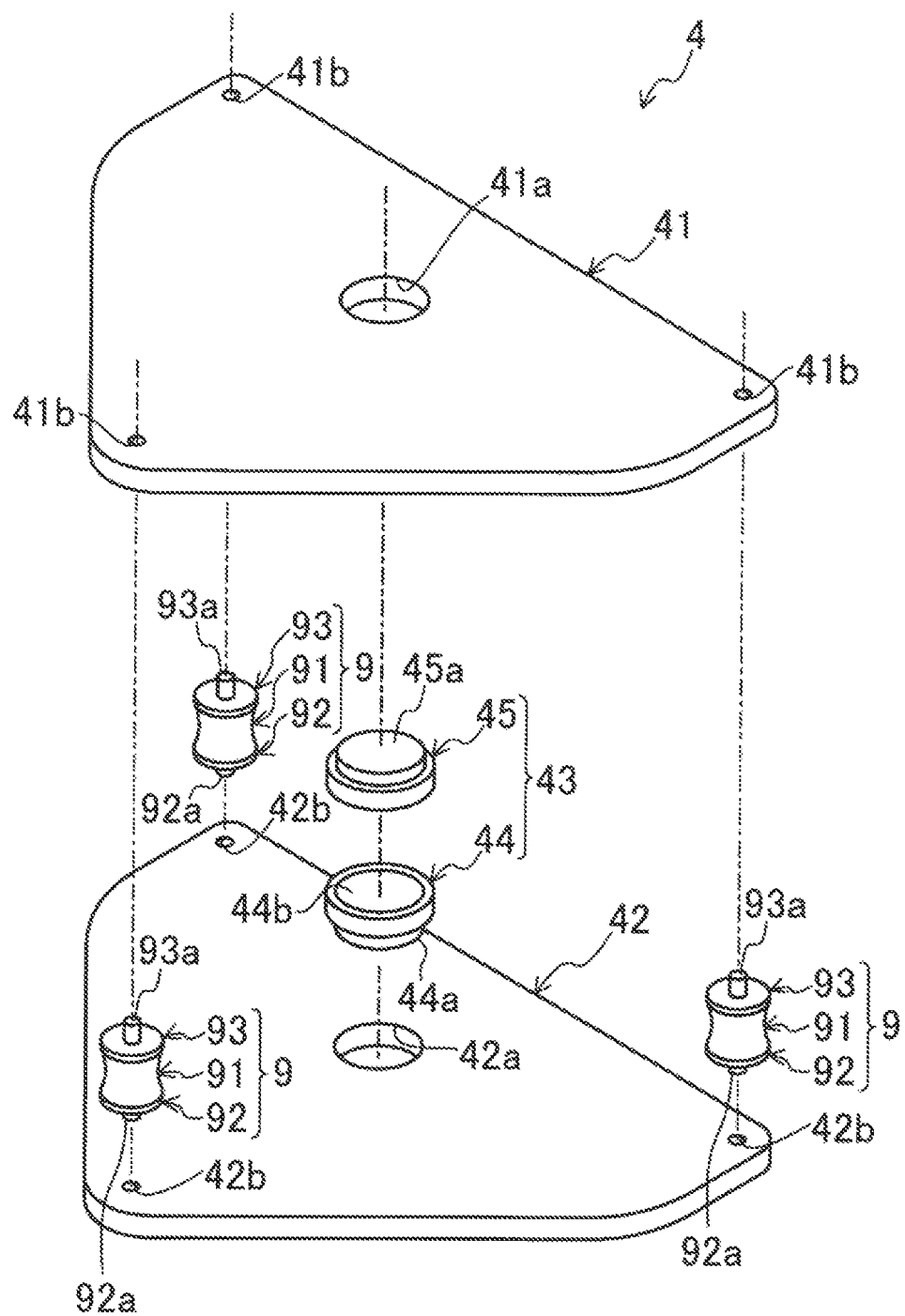
FIG. 7 is an exploded perspective view of the tilt unit shown in FIG. 6.
Figure 8:
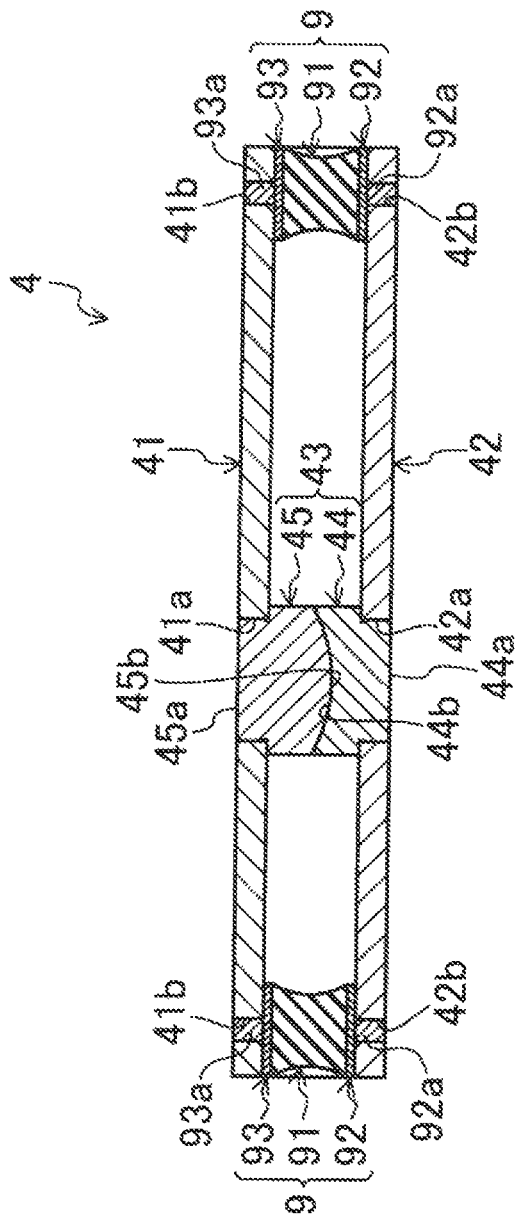
FIG. 8 is a cross-sectional view taken along the plane VIII-VIII shown in FIG. 6.

Referring to FIGS. 6-8, the tilt unit 4 includes a supporting plate 41 having a generally triangular shape in a plan view, and a base plate 42 provided on the other side of the supporting plate 41 opposite from the rotators 3 and in parallel with the supporting plate 41 and also having a generally triangular shape in a plan view. The supporting plate 41 supports the respective rotators 3 via the gearbox 2 and the respective coupling shafts Sh1.

The base plate 42 has a first fitting hole 42a at a substantially center thereof, and also has first mounting holes 42b at three corners thereof.

On the other hand, the supporting plate 41 has a second fitting hole 41a at a substantially center thereof, and also has second mounting holes 41b at respective positions corresponding to the first mounting holes 42b.

A tilt maintaining mechanism 43 (tilt maintaining means) for keeping the supporting plate 41 tilted with respect to the base plate 42 is provided between the supporting plate 41 and base plate 42 and around the center of the supporting and base plates 41 and 42.

The tilt maintaining mechanism 43 includes a generally disklike first supporting member 44, of which the lower portion functions as a first fitting portion 44a to be fitted into the first fitting hole 42a. The first supporting member 44 is secured to the base plate 42 by having the first fitting portion 44a fitted into the first fitting hole 42a.

The upper surface of the first supporting member 44 has a curved recess 44b, of which the diameter gradually decreases toward the portion of the first supporting member 44 secured to the base plate 42.

The tilt maintaining mechanism 43 also includes a generally disklike second supporting member 45, of which the upper portion functions as a second fitting portion 45a to be fitted into the second fitting hole 41a. The second supporting member 45 is secured to the supporting plate 41 by having the second fitting portion 45a fitted into the second fitting hole 41a.

The lower surface of the second supporting member 45 has a curved projection 45b to be fitted slidably into the curved recess 44b.

Furthermore, three stretchers 9 (stretchable means) which stretch and shrink vertically (i.e., along the rotational axis) are provided between the three corners of the supporting plate 41 and the three corners of the base plate 42.

Each of the stretchers 9 includes a rubber portion 91 of silicone rubber having, on a side view, a generally Japanese hand drum shape, of which the diameter gradually decreases from top and bottom toward the middle.

At the bottom of the rubber portion 91, provided is a generally disklike first mounting portion 92 having a first projection 92a at the center of the lower surface thereof. Each stretcher 9 may have its bottom portion (i.e., the other end) fixed to the base plate 42 by having the first projection 92a thereof fitted into an associated one of the first mounting holes 42b of the base plate 42.

On the other hand, at the top of the rubber portion 91, provided is a generally disklike second mounting portion 93 having a second projection 93a at the center of the upper surface thereof. Each stretcher 9 may have its top portion (i.e., one end) fixed to the supporting plate 41 by having the second projection 93a thereof fitted into an associated one of the second mounting holes 41b of the supporting plate 41.

Next, a specific procedure of removing the nozzle 11 will be described as exemplary replacement work to be done by this rotary changer 1.

First of all, after having done arc welding to a steel plate, for example, a welding torch 10 is transported by an industrial robot (not shown) to a predetermined standby position over one of the four rotators as shown in FIG. 9.

Next, as shown in FIG. 10, the welding torch 10 is inserted from over the rotator 3 into the hollow 30 thereof such that its center axis is aligned with the rotational axis C3. Then, the engaging portion 11a comes into contact with the engageable portion 60a, thus allowing the second cylindrical member 32 to start to slide downward against the biasing force of the coil spring 8.

Next, the motor 5 is activated to turn its output shaft 5a in one direction and thereby trigger clockwise rotation (i.e., rotation in the direction X1) of each rotator 3 on the rotational axis C3 via the input gear 21, idler gear 22, and output gears 23.

Then, the respective teeth and spaces of the engaging portion 11a face their counterparts of the engageable portion 60a, thereby allowing the nozzle 11 to go downward and the second cylindrical member 32 to slide upward under the biasing force of the coil spring 8. As a result, the engaging portion 11a soon gets engaged with the engageable portion 60a to have the interlocking member 6 interlocked with the outer peripheral surface of the nozzle 11. In addition, the tip of the contact tip 12 gets housed in the housing recess 33a, and the opening peripheral edge at the tip of the nozzle 11 abuts with that of the housing recess 33a.

Thereafter, as shown in FIG. 11, further clockwise rotation of the rotator 3 with the interlocking member 6 interlocked with the nozzle 11 removes the nozzle 11 from the tip portion of the torch body 10a.

At this time, the respective center axes of the tip portion of the torch body 10a and the nozzle 11 may be misaligned with the rotational axis C3 of the rotator 3. In that case, the misalignment causes the interlocking member 6 to shift in the direction of the misalignment and get interlocked with the outer peripheral surface of the nozzle 11 as each of the ball plungers 7 stretches and shrinks. Then, the respective ball plungers 7 keep the interlocking member 6 misaligned such that the rotation of the rotator 3 causes the interlocking member 6 to rotate on the center axis of the nozzle 11. Thus, the nozzle 11 starts to rotate on the respective center axes of the tip portion of the torch body 10a and the nozzle 11 that are still misaligned with the rotational axis C3 of the rotator 3. This substantially eliminates the imposition of unnecessary load on the tip portion of the torch body 10a while the nozzle 11 is being removed, which thus significantly reduces failures of welding torches 10.

Next, a specific procedure of attaching the nozzle 11 will be described as exemplary replacement work to be done by this rotary changer 1.

First of all, the nozzle 11 is set in place in the hollow 30 of one of the four rotators 3 as shown in FIG. 11. Specifically, while the nozzle 11 is inserted into the hollow 30 of the rotator 3, the engaging portion 11a of the nozzle 11 is brought into engagement with the engageable portion 60a of the interlocking member 6.

Next, the torch body 10a is transported by an industrial robot (not shown) to a predetermined standby position over the rotator 3 in which the nozzle 11 has been set.

Subsequently, as shown in FIG. 10, the torch body 10a is moved downward to bring its tip portion into contact with the opening peripheral edge at the base end of the nozzle 11. This causes the second cylindrical member 32 to start to slide downward against the biasing force of the coil spring 8.

After that, rotating the rotator 3 counterclockwise (i.e., in the direction X2) with the second cylindrical member 32 slid downward allows the nozzle 11 to start getting screwed onto the tip portion of the torch body 10a. In this case, assume the tip portion of the torch body 10a is brought closer to, and eventually mounted onto, the nozzle 11 with the rotator 3 allowed to rotate while the center axis of the tip portion of the torch body 10a is misaligned with the rotational axis C3 of the rotator 3. In that case, the nozzle 11 starts to get screwed on, and coupled to, the tip portion of the torch body 10a such that its center axis is shifted to get aligned with that of the tip portion of the torch body 10a as each of the ball plungers 7 stretches and shrinks. Thus, the nozzle 11 may be mounted onto the tip portion of the torch body 10a while rotating on the center axis of the tip portion of the torch body 10a with their respective center axes aligned with each other. This substantially eliminates the imposition of unnecessary load on the tip portion of the torch body 10a while the nozzle 11 is being mounted, which thus significantly reduces the failure of the welding torches 10.

As can be seen from the foregoing description, the rotary changer 1 according to the first embodiment of the present disclosure allows the nozzle 11 and the interlocking member 6 to change their relative positions in a direction intersecting with the rotational axis C3. Thus, while the nozzle 11 is being inserted into the hollow 30 of the rotator 3, an outer peripheral portion of the nozzle 11 may contact with the engageable portion 60a of the interlocking member 6 in the meantime. Even so, bringing the outer peripheral portion of the nozzle 11 into sliding contact with the engageable portion 60a of the interlocking member 6 still allows the interlocking member 6 to move such that the position of the engageable portion 60a agrees with that of the outer peripheral surface of the nozzle 11. This results in avoidance of deformation or damage around the interlocking member 6.

In addition, the engaging portion 11a is a knurled one. Thus, rotating the rotator 3 while inserting the welding torch 10 into the hollow 30 makes the engaging portion 11a of the nozzle 11 contact with the engageable portion 60a of the interlocking member 6 first and then allows the respective teeth and spaces of the engaging portion 11a to face, and mesh with, their counterparts of the engageable portion 60a at predetermined timings. This allows the engaging portion 11a to get engaged with the engageable portion 60a while letting the nozzle 11 move downward. Consequently, simply inserting the welding torch 10 into the hollow 30 allows the nozzle 11 and interlocking member 6 to get interlocked with each other.

Furthermore, rotating the rotator 3 while inserting the welding torch 10 into the hollow 30 allows the second cylindrical member 32 to slide downward against the biasing force of the coil spring 8 since the engaging portion 11a has contacted with the engageable portion 60a and until the respective teeth and spaces of the engaging portion 11a face their counterparts of the engageable portion 60a. As a result, the coil spring 8 absorbs the force applied to the second cylindrical member 32. Also, when the respective teeth and spaces of the engaging portion 11a face their counterparts of the engageable portion 60a, the nozzle 11 moves downward and the second cylindrical member 32 slides upward under the biasing force of the coil spring 8, thus causing the engaging portion 11a to get engaged with the engageable portion 60a. This sufficiently reduces the load to be imposed on the rotator 3 while the engaging portion 11a is getting engaged with the engageable portion 60a, thus making the rotary changer 1 less fragile and getting the engaging portion 11a engaged more easily with the engageable portion 60a.

Moreover, the respective ball portions of the ball plungers 7 reduce the frictional resistance between the ball plungers 7 and the interlocking member 6 moving through the hollow 30. This thus allows the interlocking member 6 to be smoothly moved to a position facing the nozzle 11.

In addition, inserting the welding torch 10 in a tilted position into the hollow 30 of the rotator 3 causes the supporting plate 41 to get tilted with respect to the tilt maintaining mechanism 43 to the same degree as the welding torch 10 and also allows each stretcher 9 to stretch or shrink to a degree corresponding to the tilt of the supporting plate 41. Thus, even if the welding torch 10 in such a tilted position is inserted into the hollow 30 of the rotator 3, the nozzle 11 may also be replaced with no load imposed on the torch body 10a.

Besides, the sliding contact between the curved projection and curved recess 45b, 44b of the tilt maintaining mechanism 43 allows the supporting plate 41 to smoothly tilt toward any direction. Thus, even if the welding torch 10 tilts to varying degrees every time the nozzle 11 is replaced with respect to the tip portion of the torch body 10a, the supporting plate 41 may be tilted flexibly to any desired degree corresponding to the specific degree of tilt each time.

Moreover, the stretcher 9 may be stretched with a simple structure, which lowers the manufacturing unit price of the stretcher 9, and ultimately, cuts down the overall cost of the rotary changer 1.

Second Embodiment of this Disclosure

Figure 12:
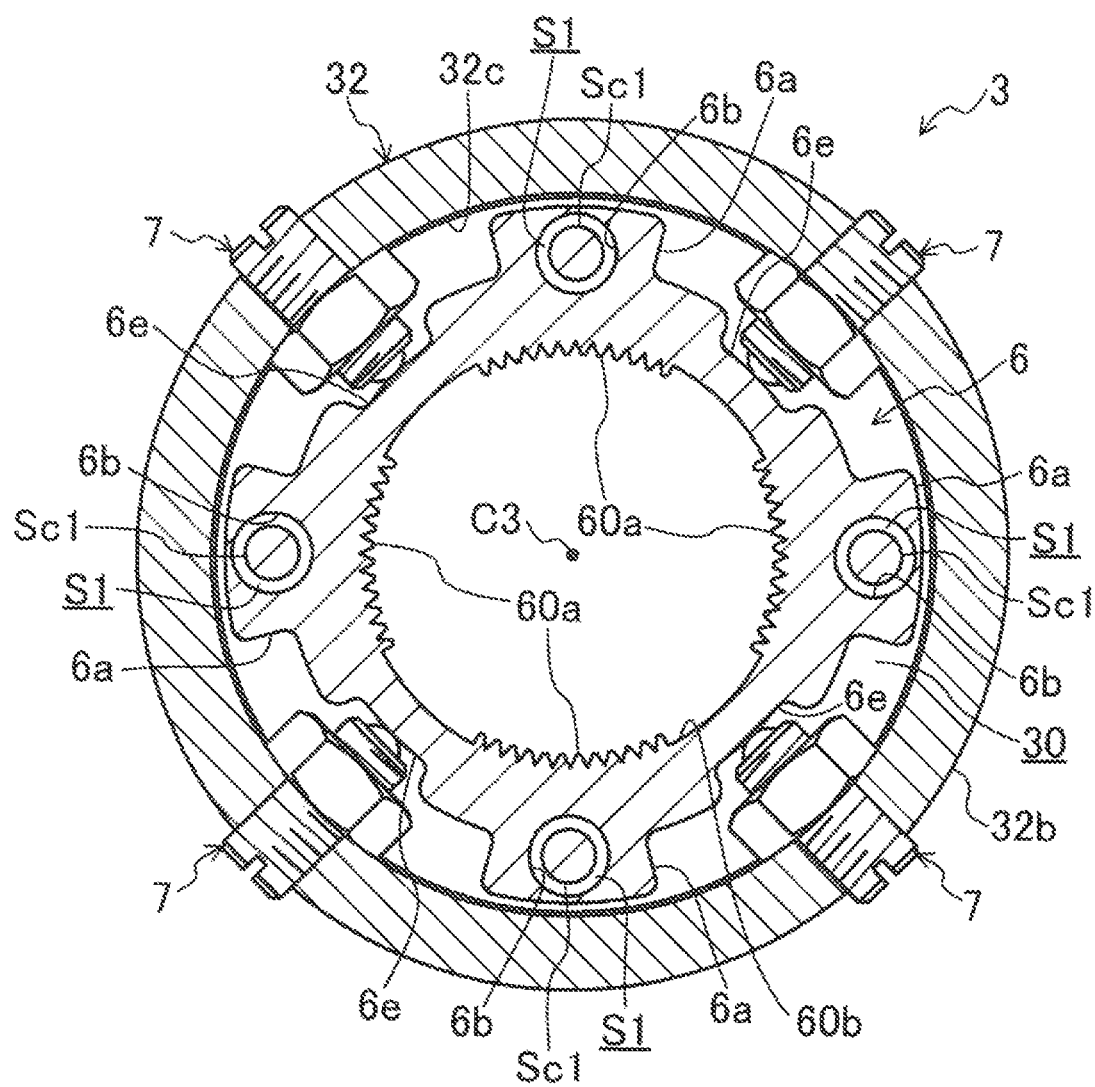
FIG. 12 is a view corresponding to FIG. 3 according to a second exemplary embodiment of the present disclosure.

FIG. 12 illustrates an internal structure of a rotator 3 in a rotary changer 1 according to a second exemplary embodiment of the present disclosure. This second embodiment is the same as the first embodiment except that an interlocking member 6 according to the second embodiment has a different structure from the counterpart of the first embodiment. Thus, the following description of the second embodiment will be focused on only the difference from the first embodiment.

The interlocking member 6 of the second embodiment has an annular shape, and has a through hole 60b (as an exemplary interlocking portion) running through the member 6 vertically (i.e., along the rotational axis C3) and allowing the nozzle 11 of the welding torch 10 to pass through itself.

In the second embodiment, four engageable portions 60a are arranged at regular intervals in the circumferential direction along the inner peripheral surface of the through hole 60b.

Also, in this second embodiment, four first expanding portions 6a are provided at respective positions on the outer peripheral edge of the interlocking member 6 that correspond to the respective engageable portions 60a. According to this second embodiment, however, no second expanding portions 6c are provided unlike the first embodiment. Additionally, between each pair of the first expanding portions 6a on the outer peripheral edge of the interlocking member 6, there is an inwardly dented step portion 6e having a generally rectangular shape in a plan view.

The interlocking member 6 is configured such that when the interlocking member 6 is mounted to the second cylindrical member 32, a gap S1 is left between the inner peripheral surface of each insertion hole 6b and the outer peripheral surface of a screw Sc1 screwed therein. That is to say, the interlocking member 6 is allowed to turn on the center axis, or move horizontally, with respect to the second cylindrical member 32 to the degree allowed by the gap S1 left there.

Also, this interlocking member 6 is arranged in the hollow 30 such that the respective ball plungers 7 face the respective step portions 6e. Each of these ball plungers 7 is configured such that its ball contacts with the surface of an associated one of the step portions 6e to bias the interlocking member 6 toward the rotational axis C3.

As can be seen from the foregoing description, the second embodiment of the present disclosure has the same advantages as the first embodiment described above. Besides, the annular interlocking member 6 of this embodiment is rigid enough to prevent the rotary changer 1 from getting out of order easily even after having gone through repetitive replacements.

Third Embodiment of this Disclosure

FIGS. 13-17 depict a rotary changer 1 according to a third exemplary embodiment of the present disclosure. This third embodiment is the same as the first embodiment except that a rotator 3, a welding torch 10, and output gears 23 of the third embodiment have different structures from the counterparts of the first embodiment. Thus, the following description of the third embodiment will be focused on only the difference from the first embodiment.

Figure 13:
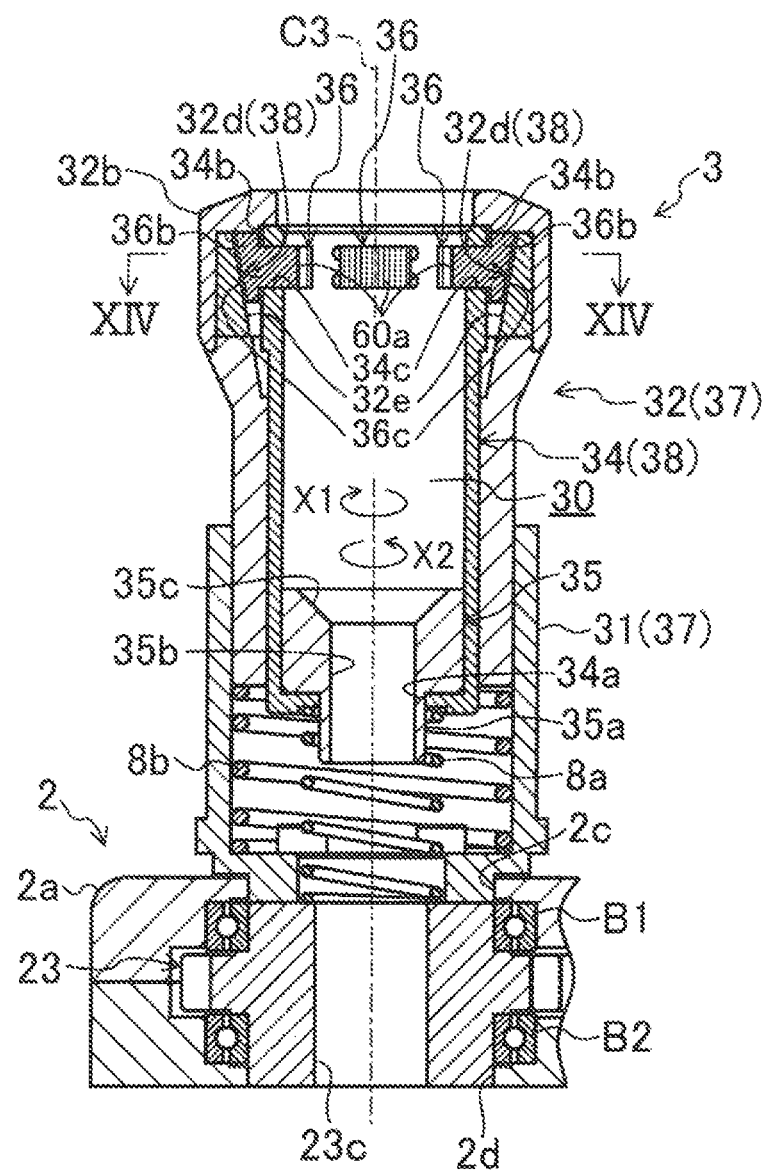
FIG. 13 is a view corresponding to FIG. 4 according to a third exemplary embodiment of the present disclosure.

Each output gear 23 according to this third embodiment has a communication hole 23c as a center hole vertically running through the gear 23 as shown in FIG. 13.

Figure 15:
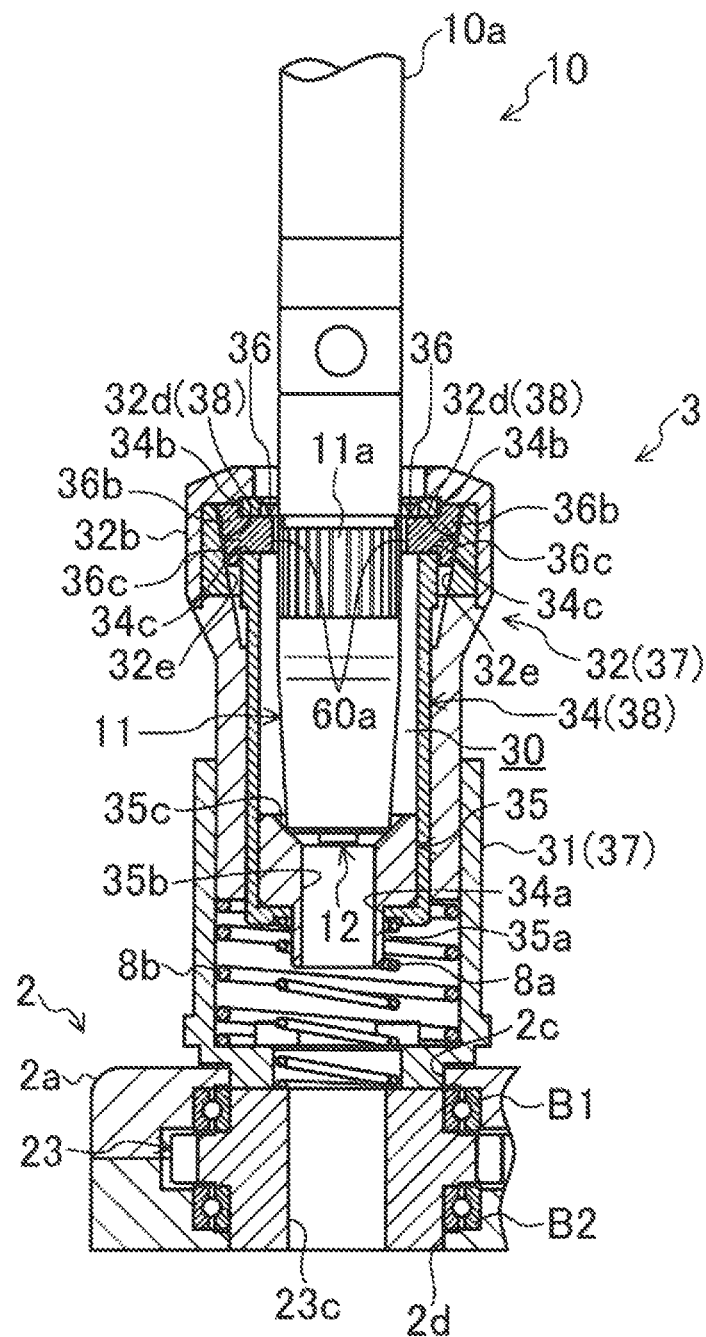
FIG. 15 is a view corresponding to FIG. 9 according to the third embodiment.
Figure 16:
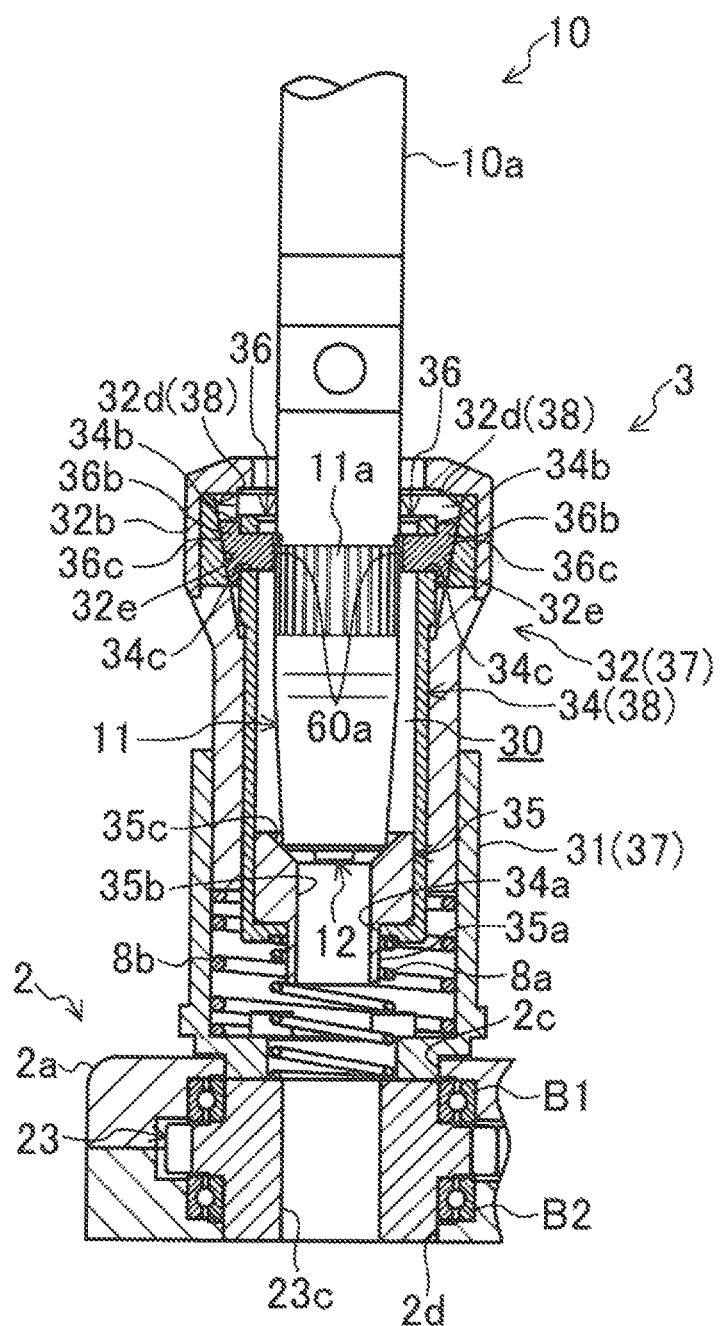
FIG. 16 is a view corresponding to FIG. 10 according to the third embodiment.
Figure 17:
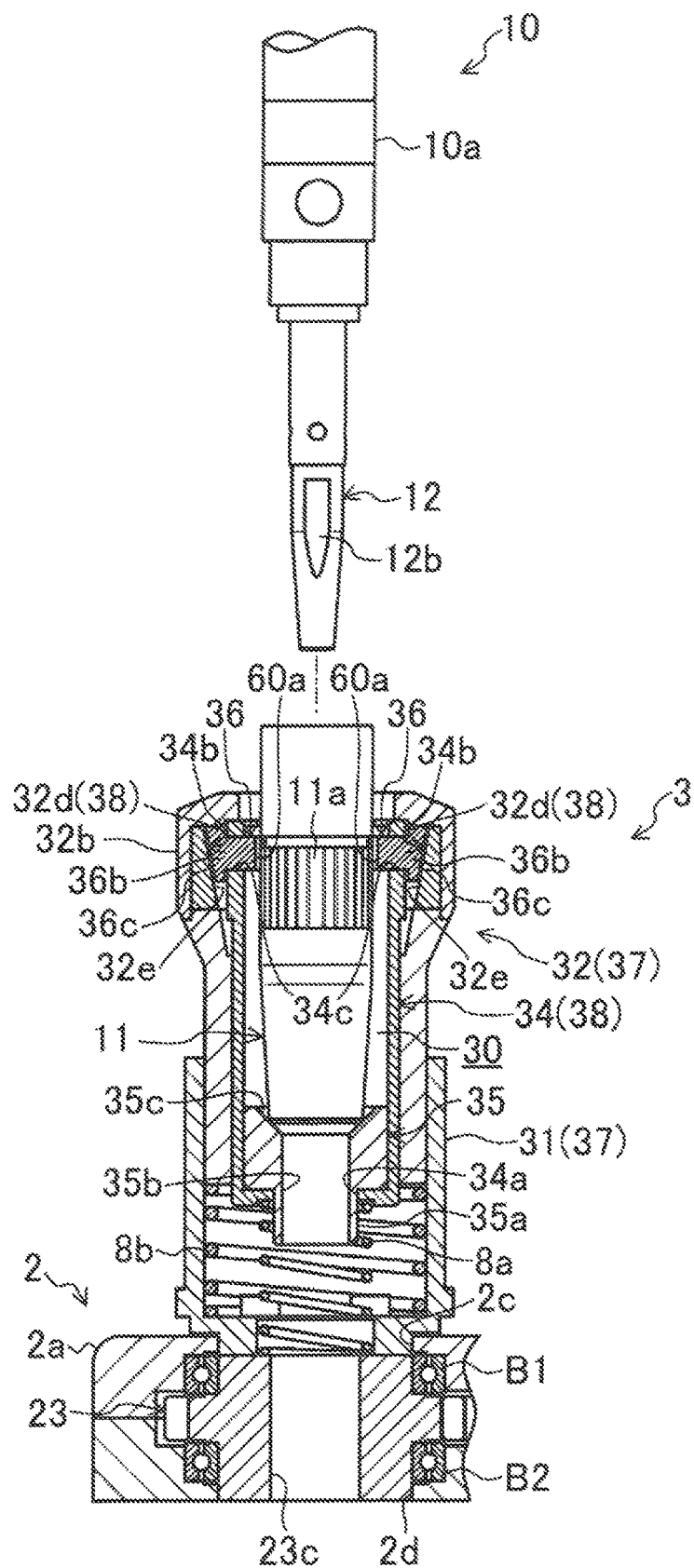
FIG. 17 is a view corresponding to FIG. 11 according to the third embodiment.

In each welding torch 10 according to the third embodiment, the nozzle 11 also has the engaging portion 11a halfway on its outer peripheral surface. However, the lower portion of the nozzle 11 closer to the tip than the engaging portion 11a is has a tapered outer peripheral surface with a diameter gradually decreasing toward the tip as shown in FIGS. 15-17.

According to the third embodiment, no guide member 24 is provided. In addition, the first cylindrical member 31 of the third embodiment has a bottom opening, which has a smaller diameter than its top opening and of which the peripheral edge is fitted into the upper through hole 2c of the gearbox 2.

Furthermore, the first cylindrical member 31 of the third embodiment has no slits 31a unlike the counterpart 31 of the first embodiment.

Moreover, no pins 32a are attached to the second cylindrical member 32 of the third embodiment unlike the counterpart 32 of the first embodiment.

Figure 14:
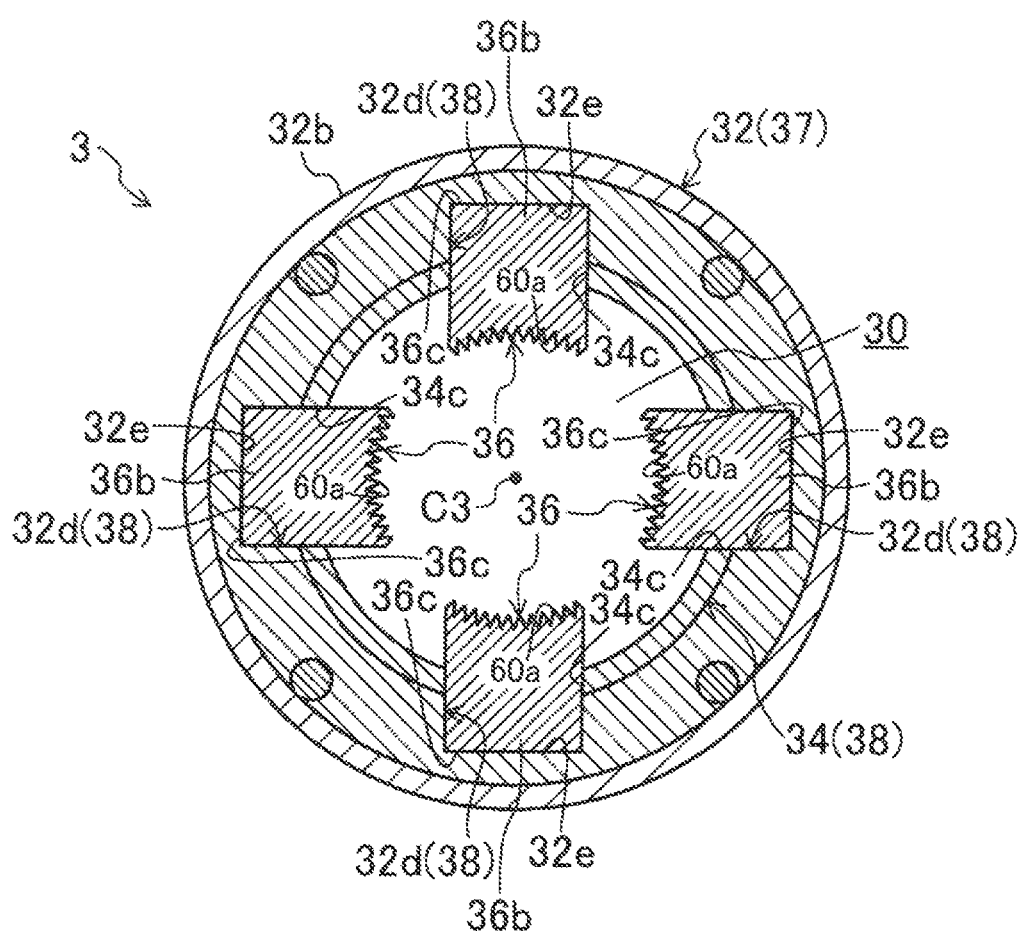
FIG. 14 is a cross-sectional view taken along the plane XIV-XIV shown in FIG. 13.

Inside the annular projection 32b of the second cylindrical member 32, four recesses 32d (cam portions) dented outward and sideward are arranged at regular intervals around the rotational axis C3 as shown in FIG. 14. The bottom 32e (i.e., a second sloping surface) of each of these recesses 32d gradually slopes toward the rotational axis C3 as the point of interest moves downward (i.e., toward the other end of the rotator along the rotational axis C3) as shown in FIG. 13.

Inside the second cylindrical member 32, a generally cylindrical sliding member 34 (sliding portion) having a center axis aligned with the rotational axis C3 is fitted and inserted so as to be slidable vertically.

The sliding member 34 has the hollow 30 that forms an upward opening, and has a fitting hole 34a at the center of its bottom.

That is to say, the first and second cylindrical members 31 and 32 according to the third embodiment together form a rotary case 37 according to the present disclosure, which houses the sliding member 34 in a slidable state.

A pressable member 35 having a convex cross section is fitted inside the bottom of the sliding member 34.

The pressable member 35 has a downwardly protruding fitting portion 35a at the center of its lower surface. The fitting portion 35a fits into the fitting hole 34a and projects out of the fitting hole 34a into the inner space of the first cylindrical member 31. The pressable member 35 has a tip avoiding hole 35b running vertically along the center axis of the member 35. The top opening of the tip avoiding hole 35b has a diameter-decreasing portion 35c, of which the diameter decreases downward so as to come gradually closer to the rotational axis C3 as the point of interest moves downward.

At the top of the sliding member 34, four protrusions 34b are provided at respective positions facing the recesses 32d so as to protrude outward and sideward. These protrusions 34b are provided to get hooked with the opening peripheral edge at the top of each recess 32d when the sliding member 34 slides upward to reach the protrusions 34b and to stop the sliding member 34 from sliding further upward.

The sliding member 34 also has guide holes 34c, which have been cut through the peripheral wall of the sliding member 34 and which are located under the respective protrusions 34b.

A moving block 36 (interlocking member) is fitted and inserted into each of the guide holes 34c such that each guide hole 34c guides the movement of its associated moving block 36 in a direction intersecting with the rotational axis C3.

Each moving block 36 has the engageable portion 60a (interlocking portion) on one side thereof that faces the rotational axis C3.

On the other side of each moving block 36 opposite from the rotational axis C3, the moving block 36 has a broadened portion 36b having a vertically broader width than any other portion thereof.

The broadened portion 36b has a slidable surface 36c (i.e., a first sloping surface) sloping toward the rotational axis C3 as the point of interest goes downward. The slidable surface 36c contacts slidably with the bottom 32e of its associated recess 32d.

Inside the first cylindrical member 31, arranged are a smaller coil spring 8a and a larger coil spring 8b. The smaller coil spring 8a is located inside the larger coil spring 8b such that their centers of spring agree with each other.

An upper portion of the smaller coil spring 8a is mounted on the outer surface of the fitting portion 35a. On the other hand, a lower portion of the smaller coil spring 8a is not only inserted into the bottom opening of the first cylindrical member 31 but also abuts with the opening peripheral edge at the top of the communication hole 23c of the output gear 23, thus biasing the sliding member 34 upward.

An upper portion of the larger coil spring 8b abuts with the bottom of the second cylindrical member 32. On the other hand, a lower portion of the larger coil spring 8b abuts downward with the opening peripheral edge at the bottom of the first cylindrical member 31, thus biasing the second cylindrical member 32 upward.

If the welding torch 10 is inserted from over the rotator 3 into the hollow 30 thereof such that its center axis is aligned with the rotational axis C3 and moved downward along the rotational axis C3, the tip of the contact tip 12 is inserted into the tip avoiding hole 35b of the pressable member 35 and a tip portion of the nozzle 11 comes into contact with the decreasing diameter portion 35c as shown in FIG. 16. As a result, the pressable portion 35 is pressed downward by the welding torch 10.

As the pressable member 35 is pressed downward by the welding torch 10, the sliding member 34 slides downward with respect to the second cylindrical member 32 against the biasing force of the smaller coil spring 8a.

The respective recesses 32d and the sliding member 34 together form a cam means 38 according to the present disclosure. The bottom 32e of each recess 32d of the second cylindrical member 32 makes sliding contact with the slidable surface 36c of an associated moving block 36 that moves downward along with the sliding member 34 sliding downward with respect to the second cylindrical member 32, thereby pressing the moving block 36 toward the rotational axis C3. The moving blocks 36 thus pressed are guided along the respective guide holes 34c to move toward the rotational axis C3.

In other words, the respective recesses 32d are configured to allow their associated moving blocks 36 to move toward the rotational axis C3 synchronously with downward sliding of the sliding member 34.

The movement of the respective moving blocks 36 toward the rotational axis C3 brings the engaging portion 11a into engagement with the respective engageable portions 60a, and allows the respective moving blocks 36 to get interlocked with the outer peripheral surface of the nozzle 11.

As the pressable member 35 is pressed further downward by the welding torch 10 with the engaging portion 11a engaged with the respective engageable portions 60a, the sliding member 34 and the second cylindrical member 32 slide integrally downward with respect to the first cylindrical member 31 against the biasing forces of the smaller and larger coil springs 8a and 8b.

Then, the rotator 3 rotates clockwise (i.e., in the direction X1) as shown in FIG. 17 with the respective moving blocks 36 interlocked with the nozzle 11, thereby turning the nozzle 11 on its center axis and removing the nozzle 11 from the tip portion of the torch body 10a.

Meanwhile, to screw and couple the nozzle 11 onto the tip portion of the torch body 10a, the nozzle 11 may be turned on its center axis in the following manner. Specifically, the sliding member 34 may be allowed to slide downward with respect to the second cylindrical member 32 with pressure applied downward from the torch body 10a to the nozzle 11 already placed in position in the hollow 30. In the meantime, the rotator 3 may be allowed to rotate counterclockwise (i.e., in the direction X2) with the respective moving blocks 36 moved toward the rotational axis C3 to bring the engaging portion 11a of the nozzle 11 into engagement with the engageable portions 60a of the respective moving blocks 36.

Next, a specific procedure of removing the nozzle 11 will be described as exemplary replacement work to be done by a rotary changer 1 according to the third embodiment.

First of all, after having done arc welding to a steel plate, for example, a welding torch 10 is transported by an industrial robot (not shown) to a predetermined standby position over one of the four rotators 3 as shown in FIG. 13.

Next, as shown in FIG. 15, the welding torch 10 is inserted from over the rotator 3 into the hollow 30 thereof such that its center axis is aligned with the rotational axis C3. Then, the tip of the contact tip 12 is inserted into the tip avoiding hole 35b of the pressable member 35 and a tip portion of the nozzle 11 comes into contact with the decreasing diameter portion 35c. Thus, the welding torch 10 presses the pressable portion 35 downward.

The pressable member 35 pressed downward by the welding torch 10 starts to slide, along with the sliding member 34, downward with respect to the second cylindrical member 32 against the biasing force of the smaller coil spring 8a.

Then, the respective moving blocks 36 also move downward along with the sliding member 34 to bring the slidable surface 36c of each of the moving blocks 36 into sliding contact with the bottom 32e of its associated recess 32d of the second cylindrical member 32. Then, force is applied to press the respective moving blocks 36 toward the rotational axis C3 as shown in FIG. 16. As a result, the respective moving blocks 36 move toward the rotational axis C3 to bring the engageable portions 60a into engagement with the engaging portion 11a of the nozzle 11. At this time, the nozzle 11 prevents the respective moving blocks 36 from moving toward the rotational axis C3 any farther, thus stopping the sliding contact between the respective bottoms 32e of the recesses 32d and the respective slidable surfaces 36c of the moving blocks 36.

Moving the welding torch 10 further downward with the engaging portion 11a engaged with the respective engageable portions 60a allows the sliding member 34 and the second cylindrical member 32 to slide integrally downward with respect to the first cylindrical member 31 against the biasing force of the smaller and larger coil springs 8a and 8b.

Next, as shown in FIG. 17, the motor 5 is activated to trigger clockwise rotation (i.e., rotation in the direction X1) of each rotator 3 on the rotational axis C3 via the input gear 21, idler gear 22, and output gears 23. This allows the nozzle 11 to rotate on its center axis and be removed from the tip portion of the torch body 10a.

Next, a specific procedure of attaching the nozzle 11 will be described as exemplary replacement work to be done by the rotary changer 1 according to the third embodiment.

First of all, the nozzle 11 is set in place in the hollow 30 of one of the four rotators 3 as shown in FIG. 17.

Next, the torch body 10a is transported by an industrial robot (not shown) to a predetermined standby position over the rotator 3 in which the nozzle 11 has been set.

Subsequently, the torch body 10a is moved downward to bring its tip into contact with the opening peripheral edge at the base end of the nozzle 11. This allows the sliding member 34 to be pressed by the nozzle 11 in contact with the diameter-decreasing portion 35c of the pressable member 35 and start sliding downward with respect to the second cylindrical member 32 against the biasing force of the smaller coil spring 8a.

Then, the respective moving blocks 36 also move downward along with the sliding member 34 to bring the slidable surface 36c of each of the moving blocks 36 into sliding contact with the bottom 32e of its associated recess 32d of the second cylindrical member 32. Then, force is applied to press the respective moving blocks 36 toward the rotational axis C3 as shown in FIG. 16. As a result, the respective moving blocks 36 move toward the rotational axis C3 to bring the respective engageable portions 60a of the moving blocks 36 into engagement with the engaging portion 11a of the nozzle 11. At this time, the nozzle 11 prevents the respective moving blocks 36 from moving toward the rotational axis C3 any farther, thus stopping the sliding contact between the respective bottoms 32e of the recesses 32d and the respective slidable surfaces 36c of the moving blocks 36.

Moving the torch body 10a further downward with the engaging portion 11a engaged with the respective engageable portions 60a allows the sliding member 34 and the second cylindrical member 32 to slide integrally downward with respect to the first cylindrical member 31 against the biasing force of the smaller and larger coil springs 8a and 8b.

Thereafter, as shown in FIG. 15, the motor 5 is activated to trigger counterclockwise rotation (i.e., rotation in the direction X2) of each rotator 3 on the rotational axis C3 via the input gear 21, idler gear 22, and output gears 23. This allows the nozzle 11 to rotate on its center axis and be attached to the tip portion of the torch body 10a.

As can be seen from the foregoing description, according to the third embodiment of the present disclosure, the moving blocks 36 are movable away from the rotational axis C3 of the rotator 3. Thus, while the nozzle 11 is being inserted into the hollow 30 of the rotator 3, the moving blocks 36 may be moved in advance away from the rotational axis C3 to avoid contact with the nozzle 11. This results in minimized deformation or damage caused around the moving block 36.

In addition, inserting the nozzle 11 into the hollow 30 of the rotator 3 allows the moving blocks 36 to move toward the rotational axis C3 and get interlocked with the outer peripheral surface of the nozzle 11. This eliminates the need to provide any separate drive source to actuate the moving blocks 36 and eventually cuts down the cost of the rotary changer 1. Additionally, pressing the engageable portions 60 of the moving blocks 36 against the outer peripheral surface of the nozzle 11 increases not only the degree of close contact, but also the linkage, between the nozzle 11 and the moving blocks 36 as well.

Furthermore, the moving block 36 moves downward integrally with the sliding member 34 while moving toward the rotational axis C3. Thus, when the engageable portions 60a contact with the outer peripheral surface of the nozzle 11, no frictional resistance is produced between them, which significantly reduces the wear of the engageable portions 60a and the nozzle 11.

The rotary changer 1 according to any of the first to third embodiments of the present disclosure is designed to replace the nozzle 11 at a tip portion of the torch body 10a. However, those embodiments are just exemplary ones, not limiting. Alternatively, the rotary changer 1 may also be designed such that the flat surfaces 12b of the contact tip 12 get interlocked with the engageable portions 60a of the interlocking member 6 (or the moving blocks 36) and that the contact tip 12 is replaced by being rotated on its center axis.

Also, in the first and second embodiments of the present disclosure, the interlocking member 6 is biased toward the rotational axis C3 by means of the ball plungers 7. However, this is only a non-limiting exemplary embodiment, and the interlocking member 6 may be biased toward the rotational axis C3 by any other type of biasing means as well.

Furthermore, in the first to third embodiments of the present disclosure, the engaging portion 11a is configured as a knurled member. Nevertheless, the engaging portion 11a may also be formed by any other type of machining as long as the nozzle 11 inserted into the hollow 30 of the rotator 3 can get interlocked with the interlocking member 6 (or the moving blocks 36).

The rotary changer 1 according to each of the first to third embodiments of the present disclosure includes the tilt unit 4 but may also be implemented without any tilt units 4.

Moreover, the stretcher 9 is stretchable and shrinkable due to the resilience of the rubber portion 91 in the first to third embodiments of the present disclosure, but may also stretch and shrink using some spring, for example.

In addition, the second cylindrical member 32 and sliding member 34 are supposed to be biased upward with the coil spring 8 or the smaller and larger coil springs 8a and 8b in the first to third embodiments of the present disclosure, but may also be biased by any other type of spring for the same purpose.

The rubber portion 91 made of silicone rubber in the first to third embodiments of the present disclosure may be made of butadiene rubber, chloroprene rubber, or any other suitable type of rubber as well.

Furthermore, in the first to third embodiments of the present disclosure, the first and second supporting members 44 and 45 are secured to the base plate 42 and supporting plate 41, respectively. Alternatively, the second and first supporting members 45 and 44 may be secured to the base plate 42 and supporting plate 41, respectively.

Optionally, the diameter-decreasing portion 35c according to the third embodiment of the present disclosure may also have a tapered shape corresponding to that of the outer peripheral surface of the nozzle 11. In that case, when the nozzle 11 is inserted from over the rotator 3 into the hollow 30 thereof, the outer peripheral surface of the nozzle 11 smoothly fits into the diameter-decreasing portion 35c, thus stabilizing the position of the nozzle 11 such that the cylinder center axis of the nozzle 11 is aligned with the rotational axis C3. Thus, when the nozzle 11 is going to be attached to the torch body 10a, the cylinder center axis of the nozzle 11 may be aligned more easily with that of the tip portion of the torch body 10a. This thus allows the nozzle 11 to be attached to the torch body 10a more reliably.

The present disclosure is useful for a rotary changer for welding torches configured to automatically replace a torch component such as a cylindrical nozzle or a contact tip bar to be screwed on, and coupled to, a tip portion of the body of a welding torch for use in arc welding.

What is claimed is:

1. A rotary changer for welding torches, the changer being configured to replace a cylindrical or bar-shaped torch component screwed on, and coupled to, a tip portion of a body of a welding torch, the changer comprising:
    a rotator arranged rotatably on a rotational axis and having
        i) an opening located at one end of the rotator, and
        ii) a hollow into which the torch component is insertable through the opening such that a center axis of the torch component is aligned with the rotational axis of the rotator; and
    an interlocking member configured to rotate integrally with the rotator and to be movable in a direction intersecting with the rotational axis, the interlocking member including an interlocking portion on one side of the interlocking member facing the rotational axis and a first sloping surface on another side of the interlocking member facing away from the rotational axis, the interlocking portion being interlockable with the torch component, the first sloping surface sloping toward the rotational axis as a point of interest moves toward the other end of the rotator, wherein
    the rotator includes a sliding portion being slidable along the rotational axis and a rotary case configured to house the sliding portion in a slidable state along the rotational axis, the sliding portion including a passable member fitted inside the sliding portion on another end thereof, the pressable member configured to be pressed by the torch component when the torch component is inserted into the hollow from one end of the sliding portion, and thereby sliding the sliding portion integrally with the torch component toward the other end of the rotator with the torch component being housed in the hollow,
    the sliding portion has a peripheral wall with a guide hole running through the peripheral wall and configured to be able to guide the interlocking member in a direction intersecting with the rotational axis,
    the rotary case includes a cam means that has a second sloping surface configured to cause the interlocking member to move toward the rotational axis by making sliding contact with the first sloping surface while the sliding portion is sliding toward the other end of the rotator,
    the rotator rotates with the interlocking portion interlocked with the torch component, thereby turning the torch component on its center axis to either remove or attach the torch component from/onto the tip portion of the torch component's body.

2. The rotary changer of claim 1, wherein:
the pressable member has at a center thereof a tip avoiding hole running therethrough along the rotational axis, the tip avoiding hole having an opening on one end thereof that includes a diameter-decreasing portion, of which the diameter gradually decreases as a point of interest moves toward another end of the tip avoiding hole,
the diameter-decreasing portion is configured to come into contact with a tip portion of the torch component when the torch component is inserted in the hollow of the rotator.

3. The rotary changer of claim 1, wherein:
the interlocking member includes a broadened portion having a vertically broader width than any other portion of the interlocking member on the other side of the interlocking member facing away from the rotational axis, and the broadened portion including the first sloping surface.

* * * * *